March 26, 1963     D. L. SMEAL     3,082,883
IRRIGATION PIPE MOVING APPARATUS
Filed Dec. 29, 1958     15 Sheets-Sheet 4
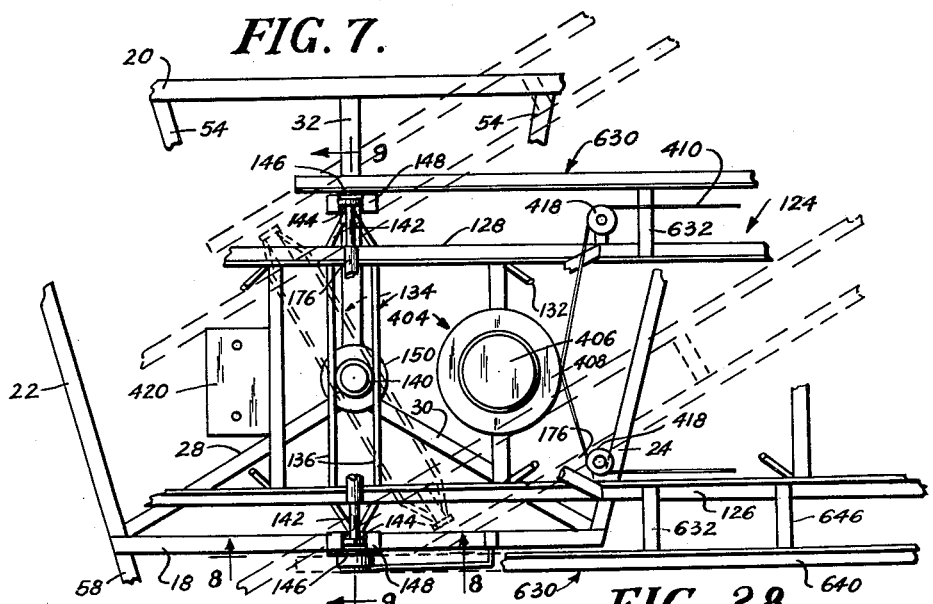
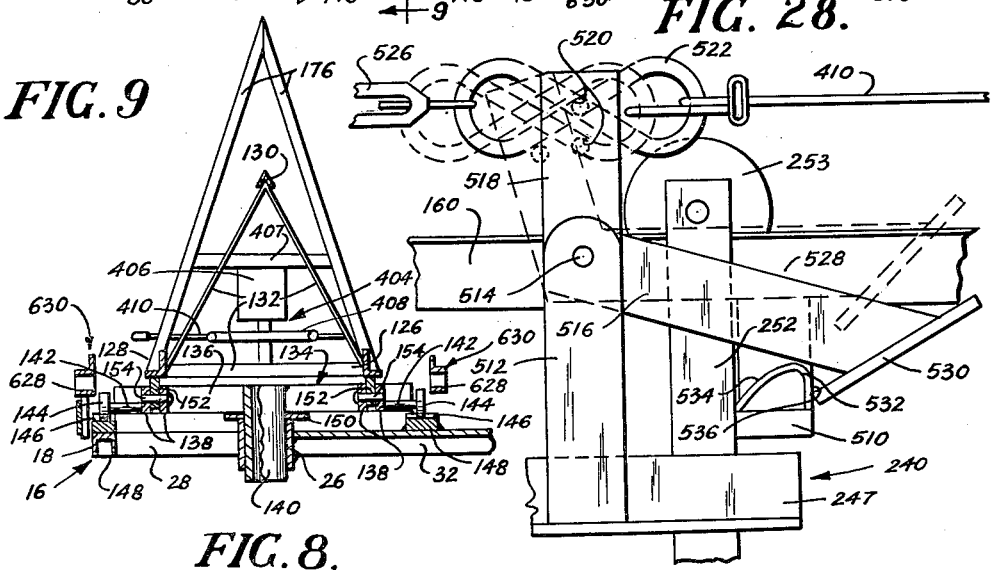
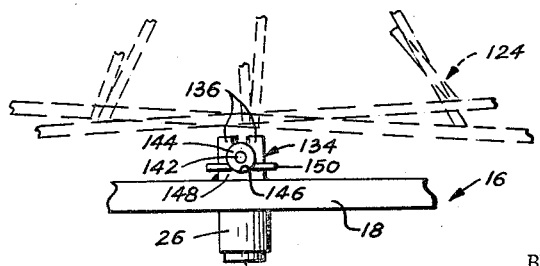
INVENTOR
DONALD L. SMEAL
BY Cushman, Darby & Cushman
ATTORNEYS March 26, 1963 D. L. SMEAL 3,082,883
IRRIGATION PIPE MOVING APPARATUS
Filed Dec. 29, 1958 15 Sheets-Sheet 5

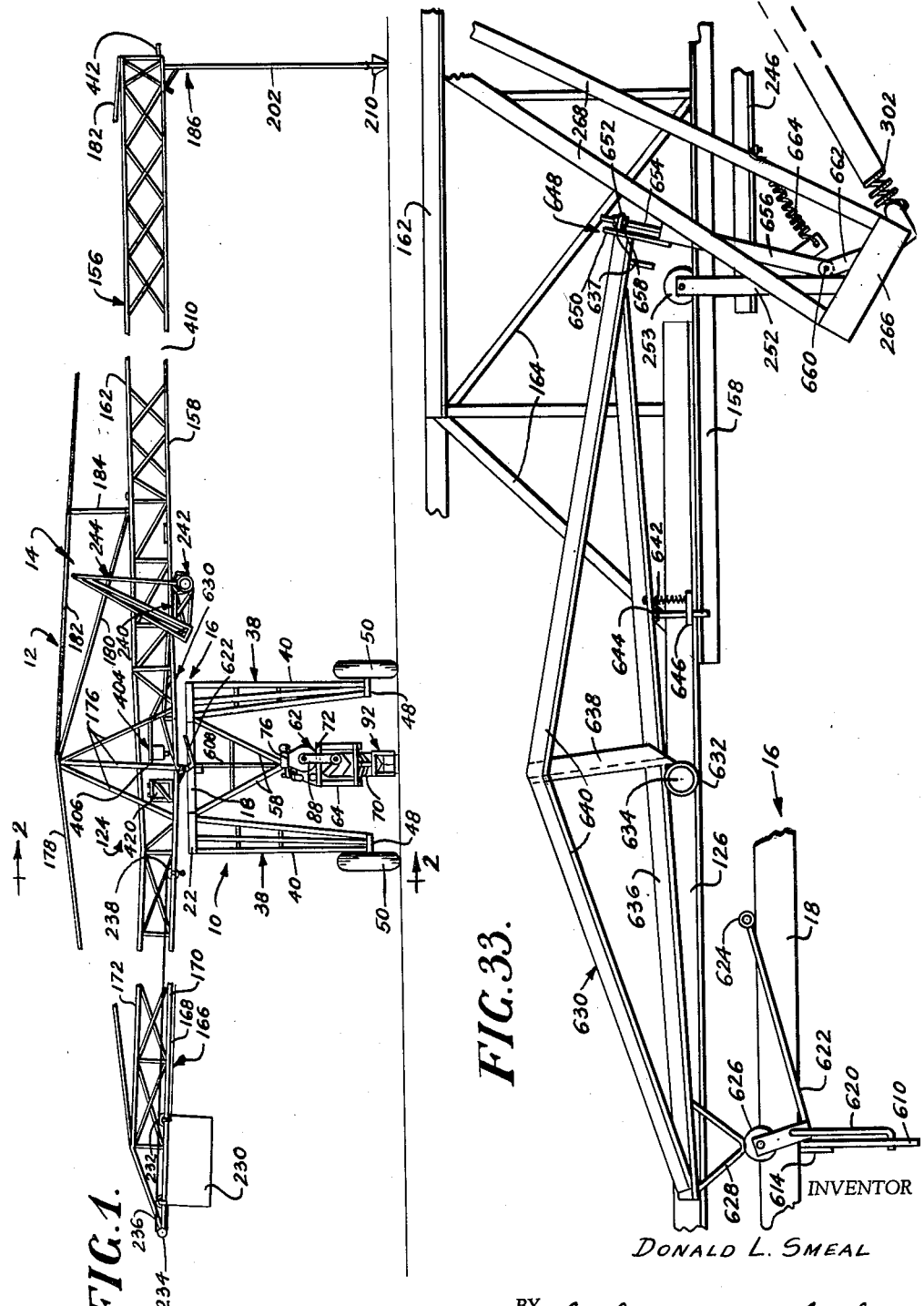

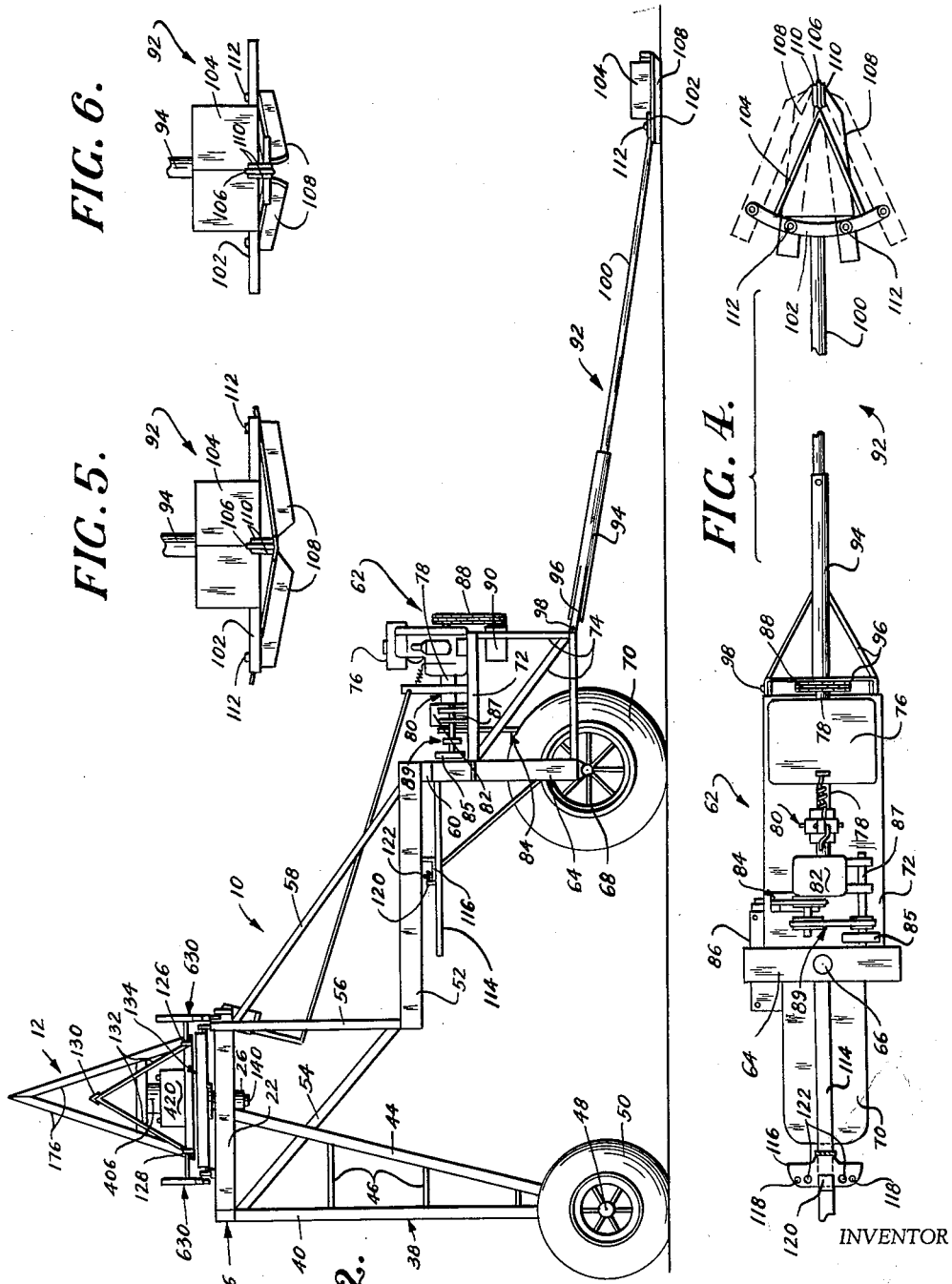

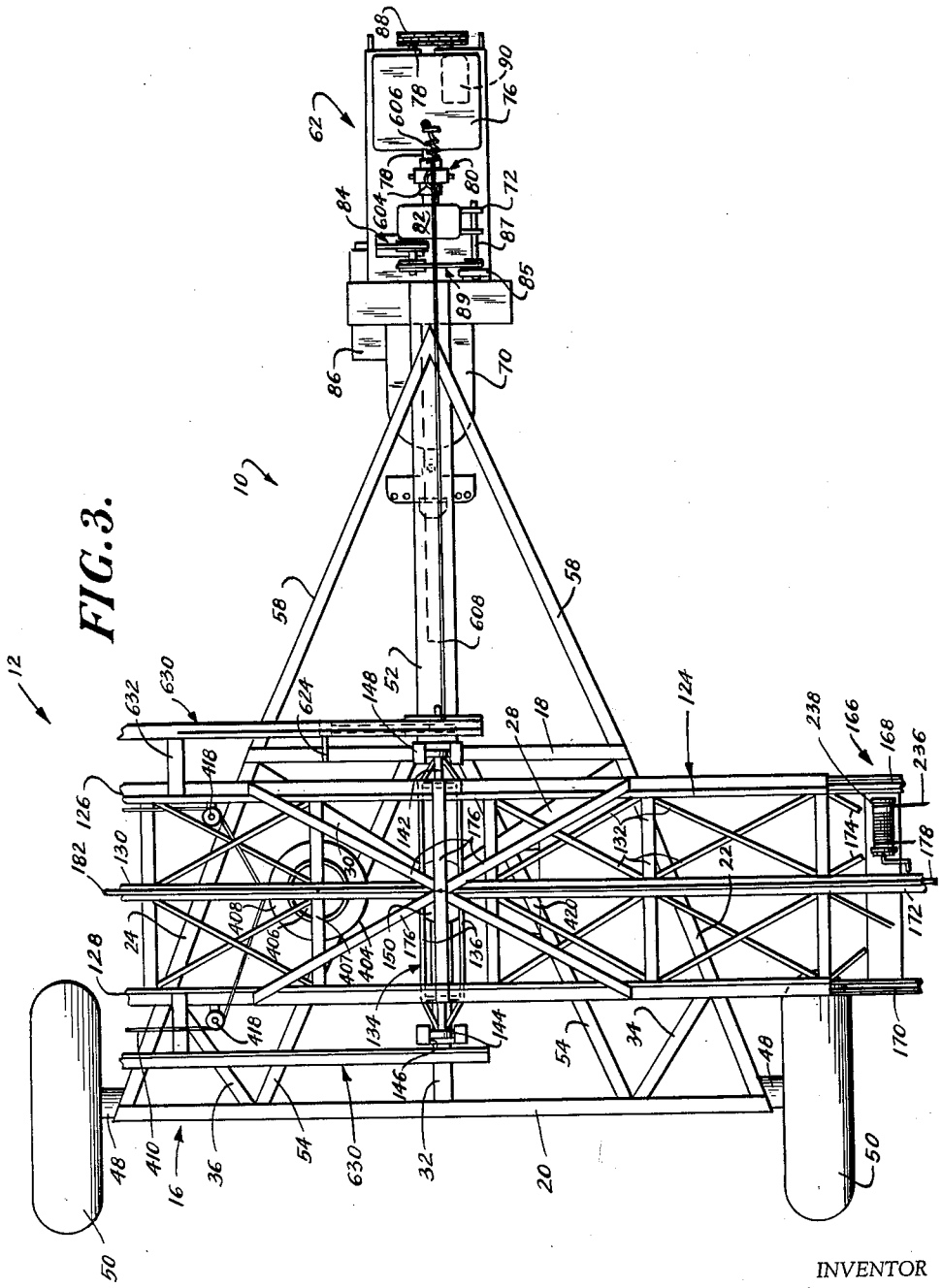

INVENTOR
DONALD L. SMEAL
BY Cushman, Darby & Cushman
ATTORNEYS

March 26, 1963 D. L. SMEAL 3,082,883
IRRIGATION PIPE MOVING APPARATUS
Filed Dec. 29, 1958 15 Sheets-Sheet 6

INVENTOR
DONALD L. SMEAL
BY Cushman, Darby & Cushman
ATTORNEYS

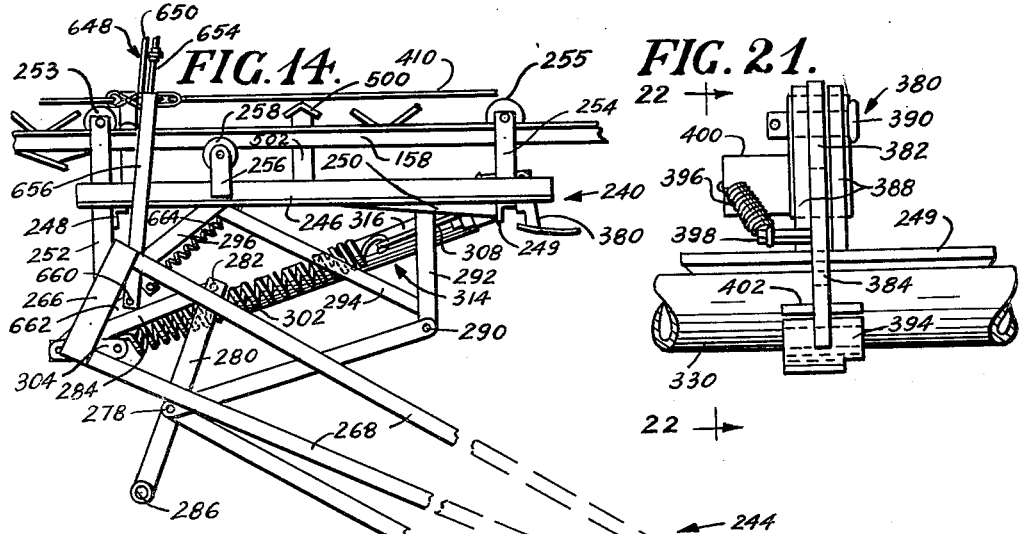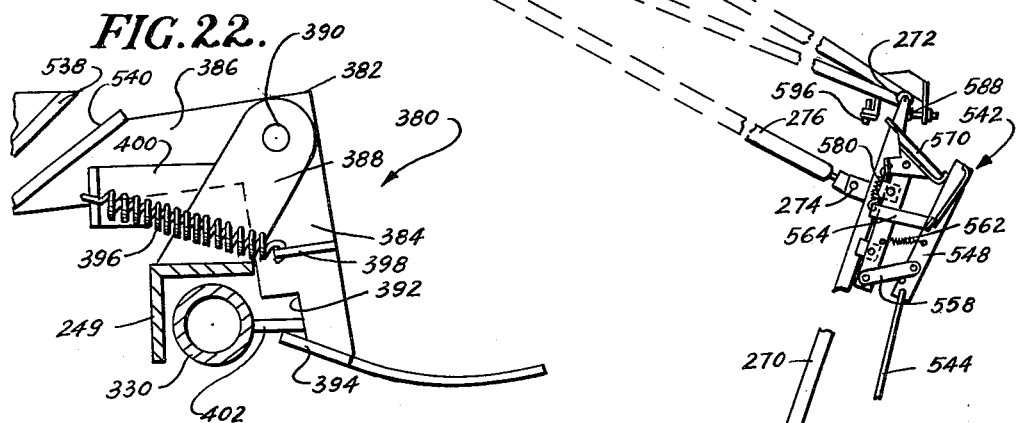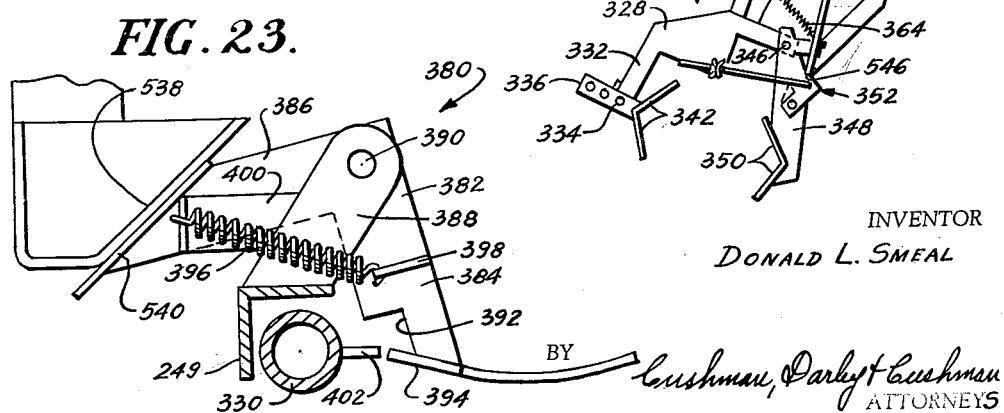

March 26, 1963 D. L. SMEAL 3,082,883
IRRIGATION PIPE MOVING APPARATUS
Filed Dec. 29, 1958 15 Sheets-Sheet 8

INVENTOR
DONALD L. SMEAL

BY Cushman, Darby & Cushman
ATTORNEYS

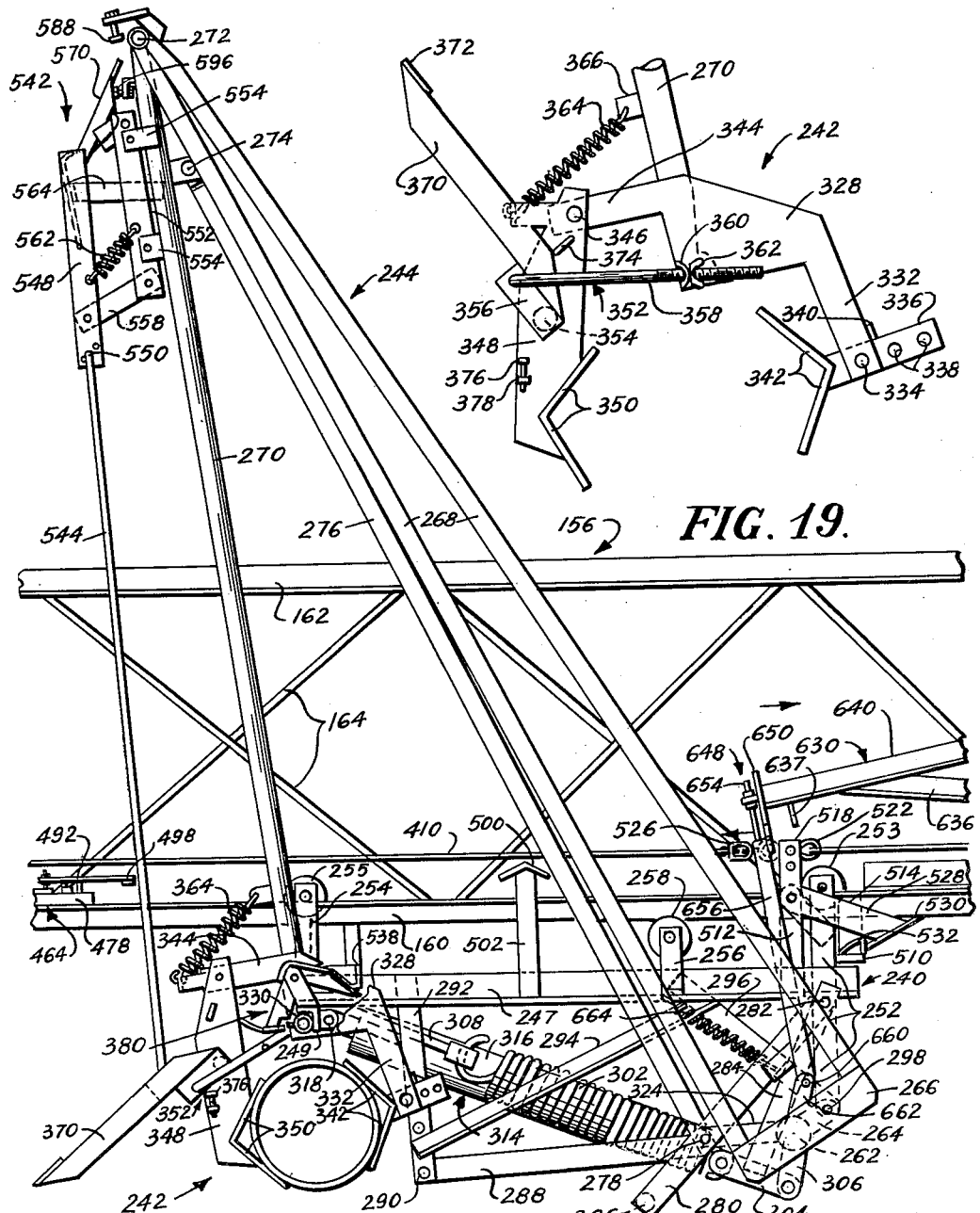

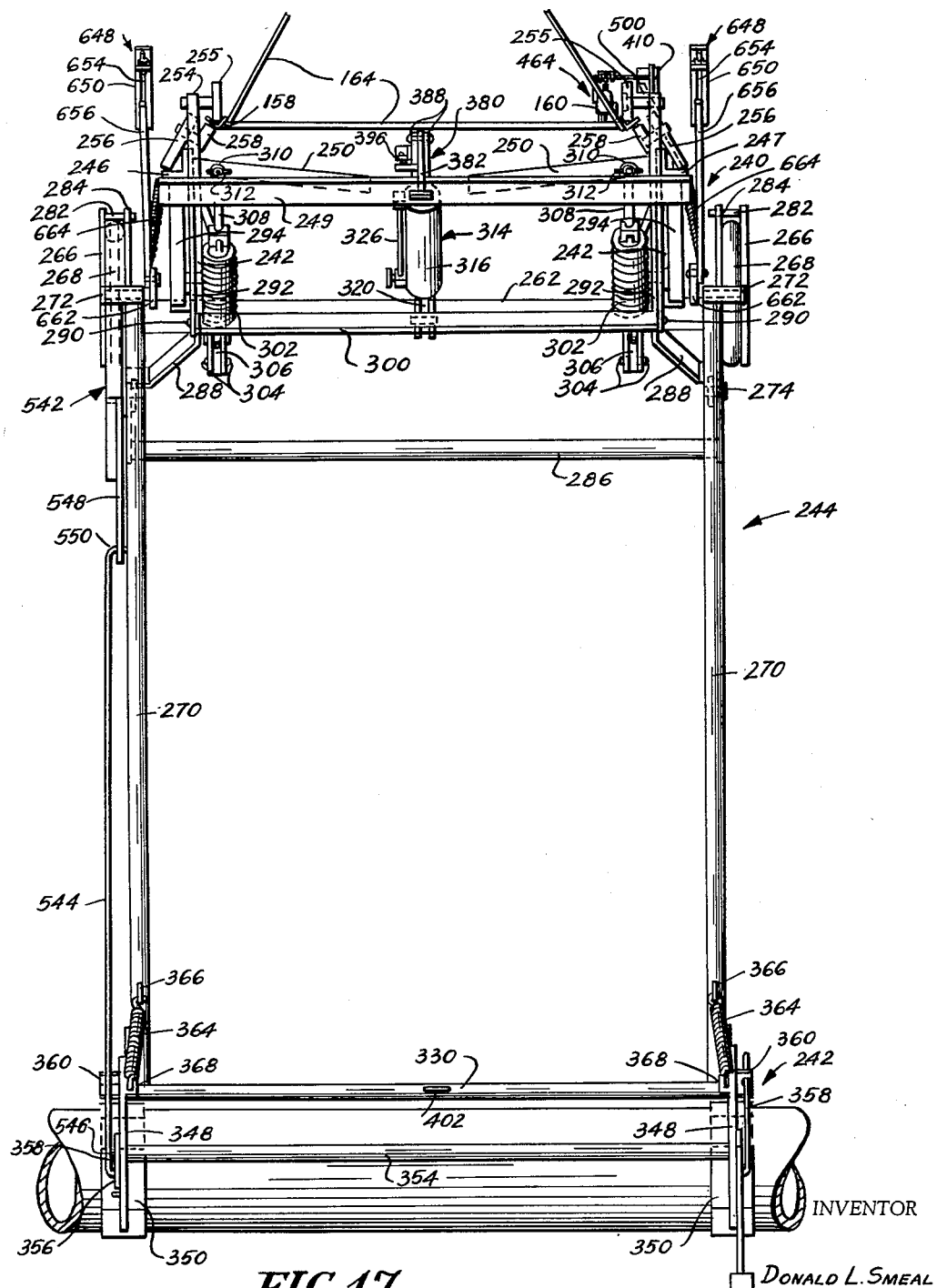

INVENTOR
DONALD L. SMEAL

March 26, 1963 D. L. SMEAL 3,082,883
IRRIGATION PIPE MOVING APPARATUS
Filed Dec. 29, 1958 15 Sheets-Sheet 12

INVENTOR
DONALD L. SMEAL
BY Cushman, Darby & Cushman
ATTORNEYS

March 26, 1963 — D. L. SMEAL — 3,082,883
IRRIGATION PIPE MOVING APPARATUS
Filed Dec. 29, 1958 — 15 Sheets-Sheet 13

INVENTOR
Donald L. Smeal
BY Cushman, Darby & Cushman
ATTORNEYS

March 26, 1963     D. L. SMEAL     3,082,883
IRRIGATION PIPE MOVING APPARATUS
Filed Dec. 29, 1958     15 Sheets-Sheet 14
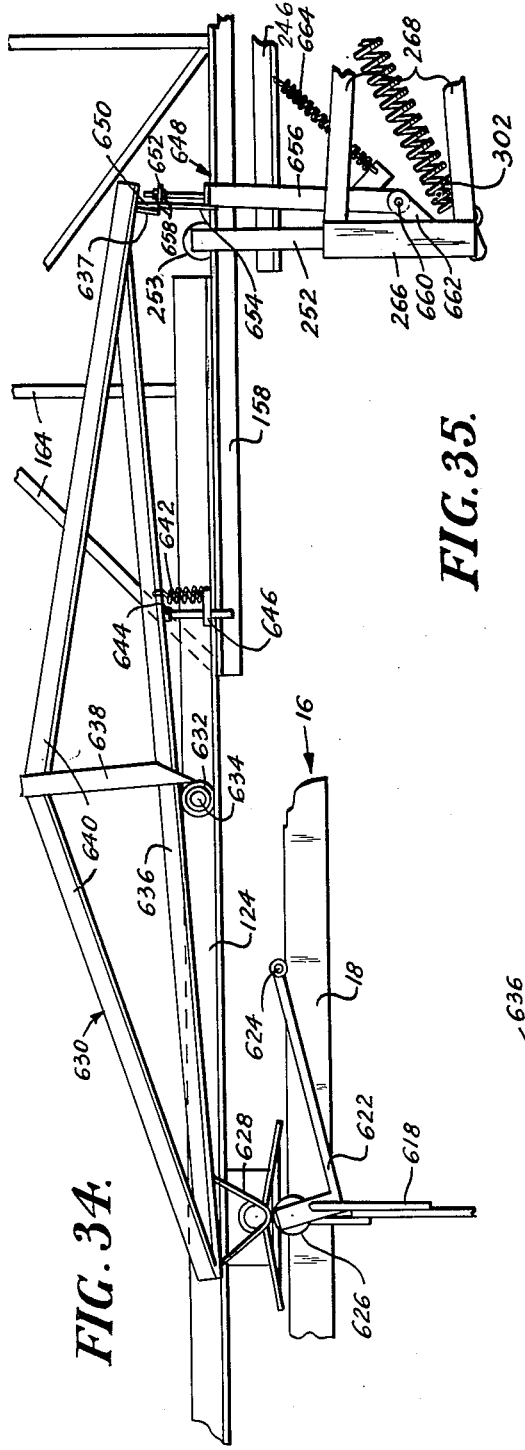
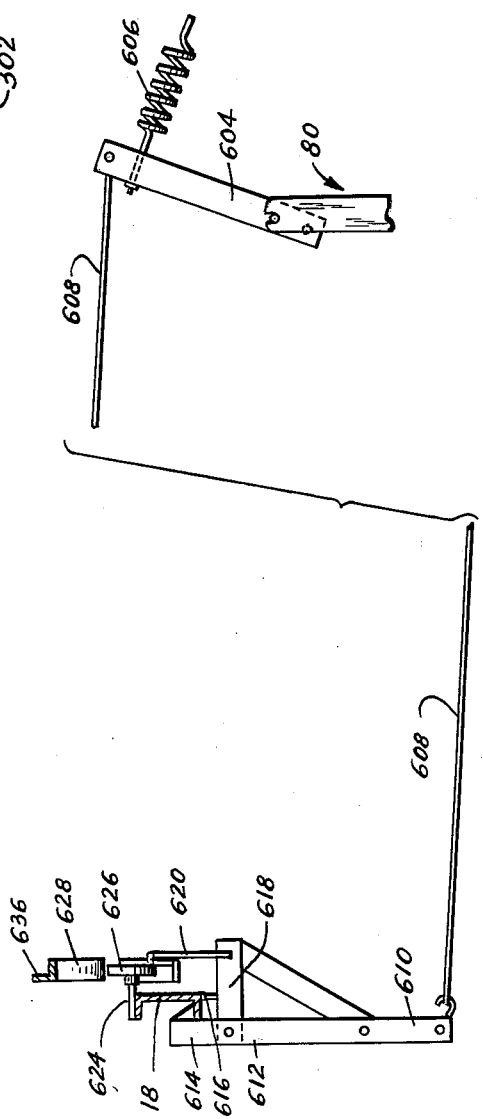
INVENTOR
DONALD L. SMEAL
BY Cushman, Darby & Cushman
ATTORNEYS March 26, 1963 D. L. SMEAL 3,082,883
IRRIGATION PIPE MOVING APPARATUS
Filed Dec. 29, 1958 15 Sheets-Sheet 15
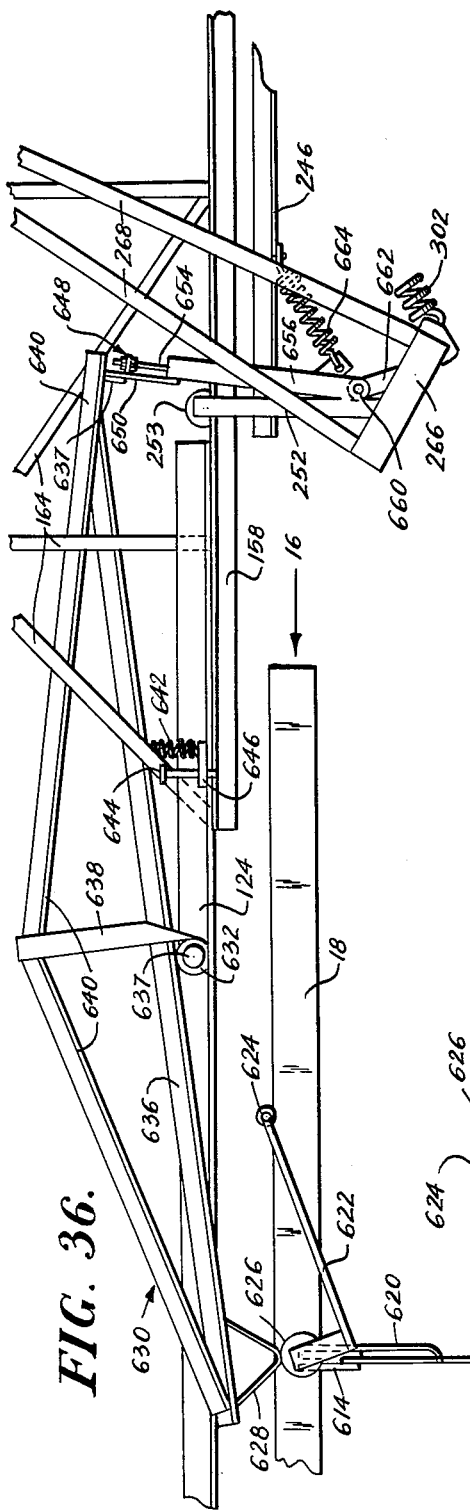
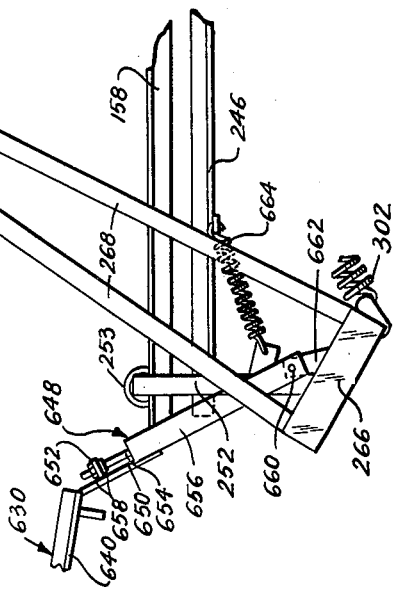
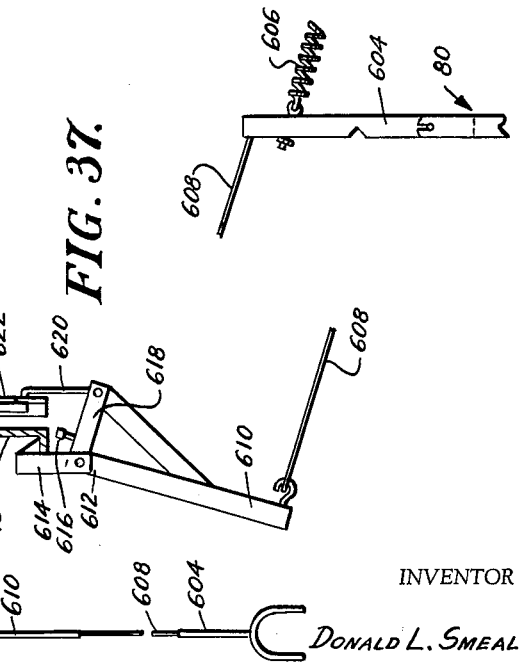
INVENTOR
Donald L. Smeal
BY Cushman, Darby & Cushman
ATTORNEYS United States Patent Office 3,082,883
Patented Mar. 26, 1963

3,082,883
IRRIGATION PIPE MOVING APPARATUS
Donald L. Smeal, Snyder, Nebr., assignor, by mesne assignments, to L. R. Nelson Mfg. Co., Inc., Peoria, Ill., a corporation
Filed Dec. 29, 1958, Ser. No. 783,299
39 Claims. (Cl. 214—1)

This invention relates to article handling and more particularly to an apparatus for moving irrigation pipe or the like in a field from one position to a second position laterally remote therefrom. This application constitutes a continuation-in-part of my co-pending application Serial No. 705,979 filed December 30, 1957 now Patent No. 2,996,197.

As disclosed in the above mentioned co-pending application, the conventional use of irrigation pipe in corn fields or the like generally requires that the pipe be connected to a main feed conduit coming from a source of water supply and extending through the field transverse to the rows of corn. Due to the capacity of the water source in most installations only one, two or possibly three lateral conduit assemblies, embodying the irrigation pipe, are connected to the main conduit in parallel relation to the rows. In the usual installation, each lateral conduit assembly is made up of pipe sections 20, 30 or 40 feet in length, coupled together to a total length of approximately one quarter mile or more. Pipe sections are usually made of aluminum in 3, 4, 5, 6 or 8 inch diameter and connected together by conventional coupling means. Riser pipes are secured to the coupling means at intervals of approximately 30, 40 or 60 feet, each riser having a sprinkler on its upper end. Ordinarily, a pipe with a riser attached will have a weight of around 35 pounds, depending on the size thereof, up to a maximum of approximately 50 pounds.

Water is pumped to the sprinklers in the lateral conduit assembly and the spray from each sprinkler extends in a radius of approximately 40 to 60 feet. In the normal operation, spraying will be continued for a period of approximately 6 to 24 hours and then the pipe sections making up the lateral conduit assembly must be moved over a distance of approximately 40 to 60 feet to sprinkle the next section of the field.

Heretofore, manual labor has been employed to effect the movement of the pipe sections from the position in which they have been operating to the new position parallel thereto 40 to 60 feet away. Such labor is difficult to perform, since, of necessity, the worker must accomplish many of the operations required in an area of the field which has been made muddy due to continuous sprinkling. The worker must go in the mud beside the lateral conduit assembly between the corn rows and disconnect the sections and then carry each one a distance of 40 to 60 feet to a position between rows and then assemble the same therein. The procedure is further made difficult due to the height of the corn, which may reach a distance of over eight feet, making it necessary for the worker to handle a 20, 30 or 40 foot pipe section weighing up to 50 pounds without excessive damage to the crop.

It will be readily apparent that the cost of the labor in effecting the movement of the pipe sections from their previous position of operation to their new position of operation spaced some 40 to 60 feet away constitutes a considerable expense particularly since this expense is multiplied by the necessary procedure of moving the pipe approximately 8 to 10 times in a 20 acre field to accomplish sprinkling of the entire field and the further necessary procedure that the entire sprinkling operation is usually carried out 4 to 6 times a year. The total cost to the farmer for the entire year just for labor in effecting movement of the pipe is sufficiently great that even a relatively expensive apparatus capable of reducing this labor cost would pay for itself over a period of two to three years.

It is an object of the present invention to provide an apparatus for effecting the movement of pipe sections from a previous position of use to a new position of use spaced laterally therefrom, which apparatus embodies improved constructional and operational features.

Another object of the present invention is the provision of apparatus of the type described including a vehicle and a boom extending laterally with respect thereto and improved means for mounting the boom on the vehicle for both tilting movement in an upright plane and swinging movement about a generally upright axis.

A further object of the present invention is the provision of an apparatus of the type described having improved means for counterbalancing and supporting the boom on the vehicle.

Still another object of the present invention is the provision of apparatus of the type described having improved means for supporting the free end of the boom in a position spaced laterally outwardly from the vehicle.

A further object of the present invention is the provision of an apparatus of the type described including an article handling carriage assembly of simple but rugged construction which is operable to handle articles such as pipe sections and the like in an improved manner.

Another object of the present invention is the provision of an apparatus of the type described having improved means for effecting movement of an article handling carriage assembly along a vehicle mounted boom section.

Still another object of the present invention is the provision of apparatus of the type described in which the carriage assembly includes pipe engaging jaws and improved means for releasing the jaws in response to a predetermined manipulation of the jaws.

A further object of the present invention is the provision of apparatus of the type described including a carriage assembly for handling articles such as irrigation pipe or the like, the carriage assembly embodying pipe gripping jaws movable between raised and lowered positions and improved means for effecting such movement.

A still further object of the present invention is the provision of apparatus of the type described having improved means operable from a position adjacent the outer end of the boom for controlling the movement of the carriage assembly longitudinally with respect to the boom.

Still another object of the present invention is the provision of apparatus of the type described which is operable by a single attendant stationed adjacent the outer end of the boom to effect a lateral movement of a pipe section from a previous position of use to a new position of use laterally remote therefrom by a semi-automatic operation.

Still another object of the present invention is the provision of apparatus of the type described having improved means for actuating the propelling means of the vehicle which is under the control of the attendant stationed adjacent the outer end of the boom.

Still another object of the present invention is the provision of apparatus of the type described including a self-propelled vehicle having improved means for automatically steering the same.

Still another object of the present invention is the provision of an apparatus of the type described having means for rendering the vehicle propelling means inoperative in response to the movement of the boom out of its operative position, as by engagement with an obstruction or the like.

These and other objects of the present invention will become more apparent during the course of the following detailed description and appended claims.

The invention may best be understood with reference to the accompanying drawings, wherein an illustrative embodiment is shown.

In the drawings:

FIGURE 1 is a front elevational view of an apparatus embodying the principles of the present invention;

FIGURE 2 is a cross-sectional view taken along the line 2—2 of FIGURE 1 showing the vehicle in side elevation and the carriage assembly removed from the boom;

FIGURE 3 is a top plan view of the apparatus with portions of the boom broken away and the vehicle steering assembly removed;

FIGURE 4 is an enlarged top plan view of the vehicle steering assembly showing the manner in which it is connected with the forward steerable wheel of the vehicle;

FIGURE 5 is a front elevational view of the furrow engaging means of the steering assembly showing the same in one position of adjustment;

FIGURE 6 is a view similar to FIGURE 5 showing the furrow engaging means in another position of adjustment;

FIGURE 7 is a fragmentary top plan view illustrating the manner in which the boom is mounted on the vehicle;

FIGURE 8 is a fragmentary cross-sectional view taken along the line 8—8 of FIGURE 7;

FIGURE 9 is a fragmentary cross-sectional view taken along the line 9—9 of FIGURE 7;

FIGURE 14 is a side elevational view of the carriage assembly showing the pipe gripping assembly in its lowered position and the jaws thereof in their opened position;

FIGURE 16 is a view similar to FIGURE 14 showing the opposite side of the carriage assembly with the pipe gripping assembly in its raised position and the jaws thereof in their closed position;

FIGURE 17 is an end view of the carriage assembly in the position shown in FIGURE 15;

FIGURE 19 is an enlarged fragmentary side elevational view of the pipe gripping assembly showing the jaws thereof in their opened position;

FIGURE 21 is an enlarged fragmentary rear elevational view of the latching means showing the manner in which the pipe gripping assembly is locked in raised position;

FIGURE 22 is a cross-sectional view taken along line 22—22 of FIGURE 21;

FIGURE 23 is a view similar to FIGURE 22 showing the manner in which the latching means is released;

FIGURE 28 is an enlarged fragmentary side elevational view of the carriage locking means illustrating the manner in which the same cooperates with the carriage;

FIGURE 33 is a fragmentary elevational view of the motor actuating means showing the position of the parts after the carriage assembly has reached its inner locked position;

FIGURE 34 is a view similar to FIGURE 33 showing the position of the parts after the pipe gripping assembly has been moved into its lowered pipe releasing position;

FIGURE 35 is a fragmentary cross-sectional view of the motor actuating means illustrating its connection with the clutch lever of the motor and the position of the parts in a condition corresponding to that shown in FIGURE 34;

FIGURE 36 is a view similar to FIGURE 33 showing the position of the parts after the actuation of the motor;

FIGURE 37 is a view similar to FIGURE 35 showing the position of the parts in a condition corresponding to that shown in FIGURE 36; and FIGURE 38 is a fragmentary view of the motor actuating means showing the position of the parts after the initial outward movement of the carriage assembly.

Figure 10:
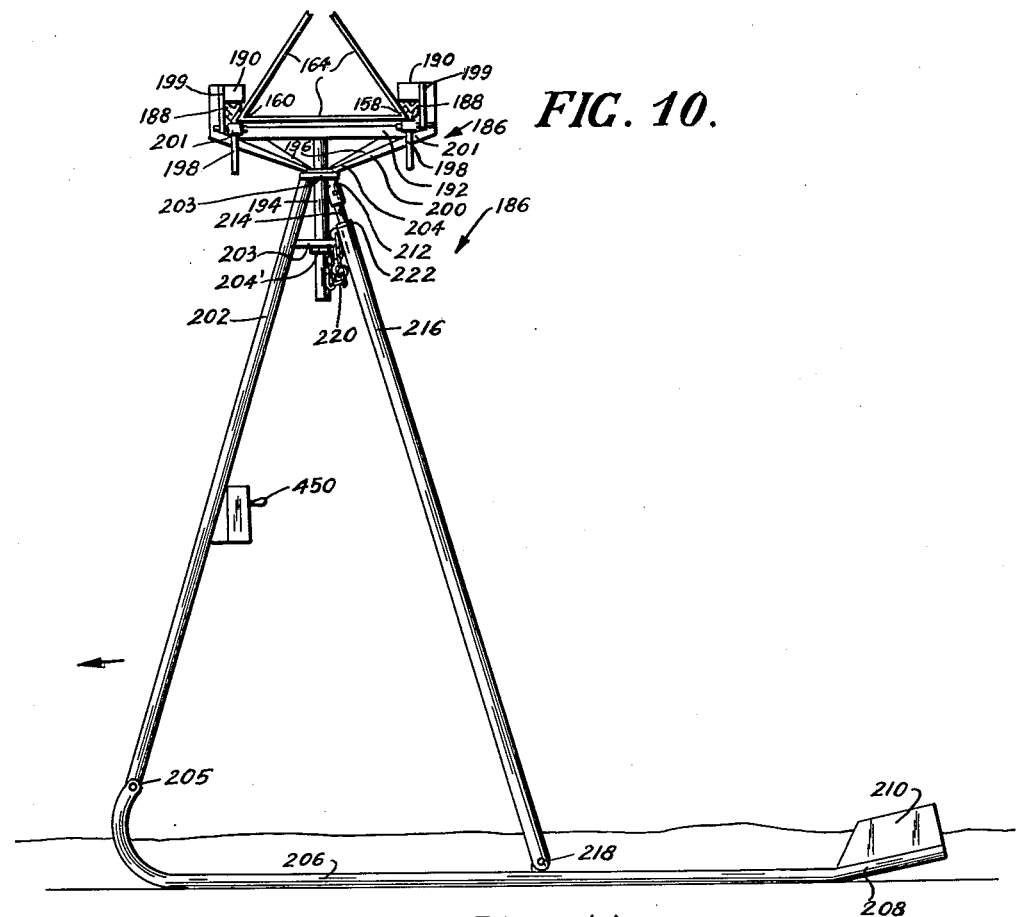
FIGURE 10 is a side elevational view of the end stand assembly showing the same in its boom supporting position.
Figure 11:
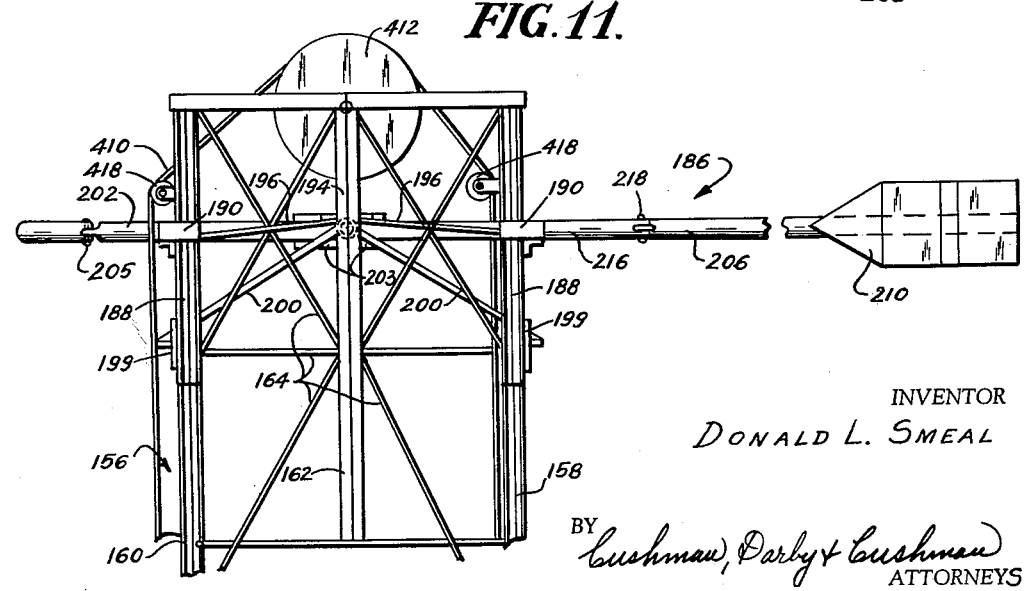
FIGURE 11 is a top plan view of the end stand assembly showing the manner in which it is connected to the boom.

Referring now more particularly to the drawings, there is shown in FIGURE 1 an apparatus embodying the principles of the present invention. The apparatus, in general, includes a self-propelled, steerable, wheeled vehicle, generally indicated at 10, which is operable to move between rows of corn or the like along a predetermined path parallel to the rows, an elongated boom assembly 12 mounted on the vehicle for tilting movement in an upright plane and swinging movement about an upright axis, and a carriage assembly, generally indicated at 14, for engaging the pipe sections and carrying the same from a previous position of use to a new position of use laterally removed therefrom.

The vehicle 10 comprises an upper horizontal frame section 16, which may be of any suitable construction and, as shown in FIGURES 1–3, is made up of structural members such as I beams or channels rigidly secured together, as by welding or the like. As best shown in FIGURE 3, the frame section 16 includes forward and rearward horizontal transverse members 18 and 20 rigidly interconnected in spaced relation by a pair of forwardly converging side members 22 and 24. Disposed in the central portion of the horizontal frame section 16 is a vertically extending sleeve 26. As shown, the sleeve is rigidly mounted within the frame section by a pair of rearwardly converging support members 28 and 30 having their forward ends rigidly secured to the intersection of the forward transverse frame member 18 and the associated side members 22 and 24 and their rearward ends rigidly secured to the sleeve. In addition, a central longitudinal member 32 has its forward end rigidly secured to the sleeve 26 and its rearward end is secured to the central portion of the rearward transverse member 20. If desired, diagonal corner braces 34 and 36 are rigidly secured to the rearward end of the frame section between the side members and the rear transverse member 20.

The horizontal frame section 16 is maintained in a position above ground level sufficient to permit the passage of corn stalks thereunder during the traversal of the vehicle through the field. To this end, the rearward end of the horizontal frame section has a pair of wheel-supporting structures 38 extending downwardly from each rearward corner thereof. Preferably, each wheel supporting structure is made up of a central tubular member 40 extending vertically downwardly from the associated corner of the horizontal frame section and a pair of downwardly converging tubular members 42 and 44 having their upper ends secured respectively to the rear transverse frame member and the associated end frame member and their lower ends extending adjacent the lower end of the central tubular member 40. The three tubular members 40, 42 and 44 may be suitably braced by horizontal braces 46 or the like, if desired. Mounted on the lower end of each wheel supporting structure 38 is a horizontally extending axle or stub shaft 48 having a wheel 50 journalled on the outwardly extending end thereof.

Disposed forwardly and below the upper horizontal frame section 16 in the central portion of the vehicle is a central tubular frame member 52. The member 52 is rigidly secured to the upper frame section by any suitable means, such as three pairs of upwardly diverging supporting arms 54, 56 and 58. The converging forward ends of the supporting arms 54 are rigidly secured to the rear end of the tubular frame member 52 and extend upwardly and rearwardly for rigid securement to the rear transverse frame member 20 of the horizontal frame section 16. The intermediate supporting arms 56 have their lower converging ends secured to the frame member 52 adjacent the support arms 54 and extending vertically upwardly for rigid engagement with the forward transverse frame member 18 of the horizontal frame section 16. The forward supporting arms 58 have their lower converging ends rigidly secured to the forward end of the frame member 52 and extend upwardly and rearwardly for rigid securement to the forward transverse frame member of the horizontal frame section 16. Extending downwardly from the forward end of the central tubular frame member 52 is a spindle or stub shaft 60 which is arranged to receive a tractor unit of the vehicle, generally indicated by the numeral 62.

The tractor unit includes a yoke 64 having a sleeve 66 rigidly secured to the bight portion thereof and extending upwardly therefrom to receive the spindle 60. Mounted within the lower ends of the legs of the yoke 64 is an axle or stub shaft 68 having a driving wheel 70 journaled thereto and connected by a driving lug with removable pin.

A motor supporting platform 72 is rigidly secured to the upper end of the yoke 64 and suitably supported in a horizontal position above the wheel 70 by any suitable means such as braces 74 or the like (see FIGURE 2). The platform 72 carries, at its forward end, a motor, preferably in the form of an internal combustion engine 76 having an output shaft 78 connected, through a clutch assembly 80, to the input shaft of a gear box 82. The output shaft of the gear box is connected, as by a sprocket and chain assembly 84, to the input shaft of a worm drive gear box 86 of conventional construction connected with the wheel axle 68. A flywheel 85 is mounted, as by a shaft 87 suitably journalled on the platform, for rotation by and with the output shaft of the gear box 82 as by a chain and sprocket assembly 89. If desired and an adjustable friction brake or shoe (not shown) on the flywheel can be provided for control of the flywheel effect, such brake shoe being connected to the engine clutch in such manner that it will not be against the flywheel or effective when the clutch is engaged. In addition, the output shaft 78 of the motor is also connected, as by a belt and pulley assembly 88, with an electric generator 90 suitably mounted on the bracing structure of the horizontal platform 72.

In order to effect automatic steering of the vehicle along the furrow between rows of corn or the like, there is provided an automatic steering means, generally indicated at 92. As best shown in FIGURES 2 and 4–6, the steering means 92 includes a sleeve 94 having its rearward end rigidly secured to a bracket structure 96 pivotally secured, as at 98, to the brace structure of the horizontal platform 72 for pivotal movement in a vertical plane about a horizontal transverse axis. Adjustably telescopically mounted within the forward end of the sleeve 94 is the rear end of a steering bar or pipe 100, the forward end of which is rigidly secured to an arcuate bar 102. The rearward end of a ballast box 104 is rigidly secured, as by welding or the like, to the arcuate bar 102 and has a lug 106 rigidly secured to its forward end and extending forwardly therefrom. Mounted below the ballast box 104 and the arcuate bar 102 is a pair of rearwardly diverging runners 108. As best shown in FIGURES 5 and 6, each of the runners 108 is formed from an angle iron with one flange thereof extending vertically downwardly for engagement with the ground and having its forward end tapered rearwardly. The runners 108 are angularly adjustable with respect to each other by any suitable means and, as shown, the forward ends of the runners are secured to the lug 106, as by upstanding lugs 110 suitably fastened to the lug 106. The rearward ends of the runners are adjustably secured, as by bolts 112 or the like to different positions spaced along the arcuate extent of the bar 102.

In order to limit the turning movement of the wheel 70, when the steering means 92 is in operation, and to provide a means for steering the wheel, when steering means 92 is not used, there is provided a tiller bar 114 which has its forward end rigidly secured to the yoke 64 and extends rearwardly therefrom. A plate 116 is rigidly mounted below the central tubular frame member 52 and is provided with a series of transversely spaced openings 118. An L-shaped bar 120 is rigidly secured to the tiller bar intermediate its ends above the upper surface of the plate 116. It will be seen that by inserting pins 122 in selected openings 118 in a position to be engaged by the bracket 120, the pivotal movement of the tractor unit 62 about the axis of the sleeve 60 can be adjustably limited.

Of course, by removing the pins 122 turning movement of the tractor unit is not so restricted and therefore the unit can be steered manually through the tiller bar 114 by an attendant stationed on the frame. In this regard, the drive wheel 70 is provided with a removable pin (not shown) so that the driving engagement of the motor 76 with the front wheel 70 can be disengaged for the purpose of permitting the vehicle to be freely towed by a tractor or the like.

The boom assembly 12 comprises a central section or portion 124, which is built up of a plurality of structural members, such as angle irons or the like, rigidly secured together as by welding or the like. As best shown in FIGURE 9 the central portion of the boom assembly includes three longitudinal frame members, 126, 128 and 130, preferably in the form of angle irons, arranged with the members 126 and 128 in horizontally spaced relation and the member 130 above and between the members 126 and 128. The members are maintained in this position by suitable diagonal braces 132 extending between the various members.

The central section 124 of the boom assembly 12 is mounted on the vehicle for tilting movement in an upright plane and swinging movement about an upright axis by any suitable means, such as trunnion frame 134. The trunnion frame may be of any suitable construction and as best shown in FIGURES 7–9 comprises a pair of elongated plate members 136 rigidly secured together in spaced relation by pairs of transverse plates 138. Mounted in the central portion of the trunnion frame 134 between the elongated members 136 is a shaft 140, preferably in the form of a pipe or tubular section arranged to seat within the sleeve 26 rigidly supported in the central portion of the horizontal frame portion 16 of the vehicle. Extending outwardly from opposite ends of the trunnion frame 134 is a pair of horizontal longitudinally aligned pins 142 having cam rollers 144 rotatably mounted on the outer ends thereof. The cam rollers 144 are arranged to seat within upwardly concave surfaces 156 formed in cams 148 rigidly secured to the brace member 32 and forward transverse member 18 respectively of the horizontal frame section. The vertical position of the upwardly concave surfaces 146 is slightly above the vertical position of the upper surface of the sleeve 26 rigidly mounted in the horizontal frame section 16 so that when the cam rollers 144 are engaged within the arcuate surfaces 146 the trunnion frame will be supported by the cam rollers in a fixed position for yielding movement therefrom. That is, the trunnion frame 134 can pivot about the axis of the sleeve only after the cam rollers have ridden over the arcuate surfaces 146. In order to support the trunnion frame 134 for swinging movement about the axis of the sleeve 26 a horizontal plate 150 is welded or otherwise rigidly secured beneath the members 136 in cylindrical relation to the shaft 140. The plate 150 engages the upper surface of the sleeve 26 to support the trunnion frame 134 during its swinging movement between the positions of engagement of the rollers 144 within the surfaces 146.

The trunnion frame 134 is pivotally connected with the central portion 124 of the boom assembly 12 by any suitable means, such as lugs 152 (see FIGURE 9) rigidly secured to the members 126 and 128 of the boom portion and extending between the pairs of transverse plates 138 of the trunnion frame. The plates and lugs are suitably apertured to receive aligned pivot pins 154 which serves to mount the central portion of the boom and therefore the entire boom assembly on the vehicle for tilting movement in a generally upright plane.

The boom assembly 12 also includes an elongated operative portion or section 156 which preferably is also of a triangular truss-like construction similar to the central portion and includes three longitudinal extending members 158, 160 and 162. As best shown in FIGURE 17, the lower horizontally spaced members 158 and 160 are of angle iron construction mounted so that their flanges diverge upwardly to form trough-like tracks within which the carriage assembly 14 is mounted for longitudinal movement along the operative boom portion. As before, the longitudinal members 158, 160 and 162 are rigidly interconnected in spaced relation by a plurality of diagonal brace bars or rods 164. The operative section of the boom assembly 12 is rigidly secured to the central section of the boom assembly with the longitudinal members thereof by any suitable means such as welding or the like. Of course, it will be understood that the sections can be detachably interconnected as by bolts or the like, as is well-known in the art.

In a like manner, a counter-balancing boom portion or section 166 extends outwardly from the opposite end of the central boom section in longitudinal alignment therewith. This section includes similar longitudinal members 168, 170 and 172 interconnected in spaced relation by a plurality of diagonal brace rods 174. As before, the longitudinal members 168, 170, and 172 of the counter-balancing boom section are rigidly secured in general alignment with the longitudinal members of the central boom section as by welding or the like.

In order to strengthen the boom sections and to support the same outwardly of the vehicle, there is provided a plurality of upwardly converging truss bars 176 having their lower ends rigidly secured to the lower longitudinal members of the central boom section and their upper ends rigidly secured together, as by welding or the like, and arranged to receive one end of a plurality of tie rods 178, 180 and 182. The tie rod 178 extends downwardly and outwardly to the outer end of the counter-balancing boom section while the tie rod 180 extends downwardly and outwardly to the operative boom section 156 at a point intermediate its ends. A guide bar 184 extends upwardly from the operative boom section 156 adjacent the point of attachment of the tie rod 180 therewith and the tie rod 182 extends from the upper end of the truss rods over the guide bar 184 and is secured to the outer end of the operative boom section.

As noted above, the carriage assembly 14 is movable longitudinally along the operative boom section 156. In order to provide stability to the operative boom section 156 when the carriage assembly 14 is disposed on the outer end thereof, there is provided an end stand assembly, generally indicated at 186.

Referring now more particularly to FIGURES 10–13, the end stand assembly 186 is preferably mounted on the operative boom section for longitudinal adjustment by any suitable means and, as shown, the end stand assembly comprises a pair of angular track engaging elements 188 secured in horizontally spaced relation by a pair of L-shaped brackets 190 having their horizontal legs rigidly secured to the upper surface of the track engaging elements adjacent their outer ends and their vertical legs rigidly inter-connected to opposite ends of a cross bar 192. Extending downwardly from the central portion of the cross bar 192 is a vertical stem 194, the upper end portion of which is braced by a pair of diagonal strengthening bars 196 downwardly from the ends of the bar 192 to the upper end portion of the stem 194.

The track engaging elements 188 are arranged to engage within the track provided by the frame members 158 and 160 of the operative boom section and are secured in any desired position of longitudinal adjustment thereon by means of cam levers 198 rotatably mounted on the inner ends of the track engaging elements in spaced relation therebelow, as by plates 199 depending from the elements 188 and braces 200 extending between the plates 199 and the stem 194. Each cam lever 198 is resiliently urged into holding engagement with the bottom of its associated boom frame member by a coil spring 201 connected between the lever and the associated L-shaped bracket 190.

An elongated tubular member 202 has a pair of vertically spaced plates 203 rigidly secured to the upper end thereof which are suitably apertured to receive the vertical stem 194. A plate 204 is rigidly secured to the stem adjacent the connection of the strengthening rods 196 thereto to limit the upward movement of the apertured plates 203 with respect to the stem. Downward movement of the plates 203 with respect to the stem is limited by a removable collar 204' suitably fixed to the stem beneath the lower plate 203. The elongated tubular member 202 extends downwardly from the stem at an angle with respect to the axis of the stem and has its lower end pivoted, as at 205, to the forward upwardly curved end of a ground engaging runner or skid 206. The rearward end of the runner 206 extends at an angle with respect to the main portion of the runner, as indicated at 208, and has rigidly secured to the upper surface thereof a ballast box 210.

The upper plate 203 has rigidly secured thereto a depending lug 212, which is pivotally connected with the upper end of a rod 214 the lower end of which is slidably received within the upper end of an elongated tubular member 216. The lower end of the tubular member 216 is pivotally mounted, as at 218, to the upper surface of the runner 206 intermediate its ends.

Figures 12, 13:
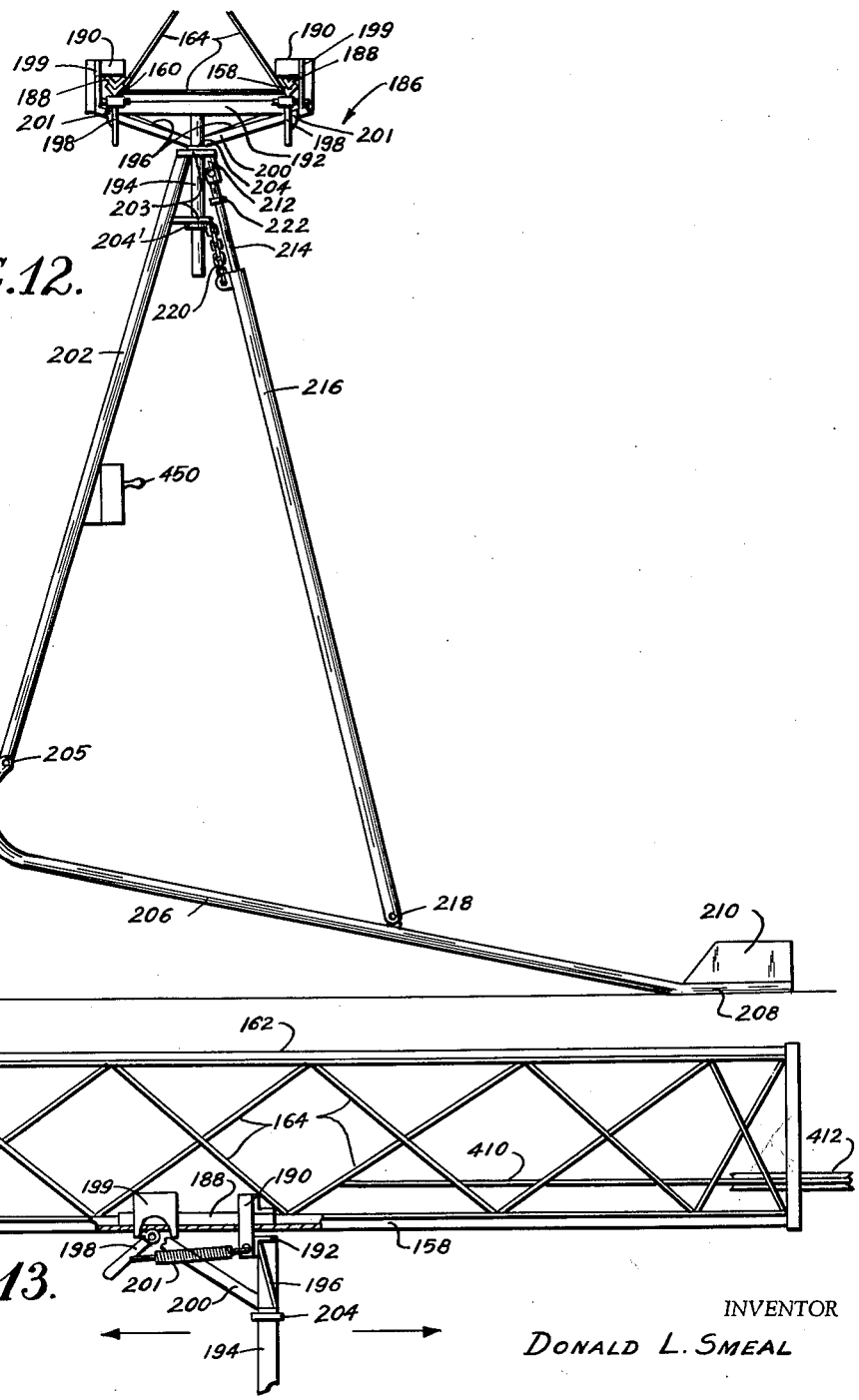
FIGURE 12 is a view similar to FIGURE 10 showing the end stand assembly in its raised position.
FIGURE 13 is an enlarged fragmentary front elevational view of the end stand assembly.

It can be seen that when the outer end of the operative boom section is raised with respect to the ground, the runner 206, by virtue of its connection with the elongated tubular members 202 and 216, will move from a position wherein the central portion of the runners engage the ground, as shown in FIGURE 10, to a position wherein the angular rear end portion 208 is disposed in engagement with the ground as shown in FIGURE 12.

Any suitable means may be provided for limiting the movement of the runner 206 downwardly with respect to the boom in response to the upward movement thereof and for limiting the upward movement of the runner with respect to the boom section in response to the downward movement of the boom. As shown, a chain 220 is connected between the upper end of the tubular member 216 and the lower apertured plate 203 and a collar 222 is adjustably secured to the rod 214 adjacent its upper end for engagement with the upper end of the tubular member 216.

In the normal operation of the present apparatus the runner 206 of the end stand assembly will be in engagement with the ground throughout its central portion, as shown in FIGURE 10, when the carriage assembly 14 is disposed adjacent the outer end of the operative boom section. As the carriage assembly is moved inwardly along the operative boom section toward the vehicle, the counter-balancing section of the boom will cause the outer end of the operative section of the boom to move upward as a result of the shifting weight of the carriage assembly 14. In order to provide adjustability so that the outer end of the operative boom section will raise in response to the inward movement of the carriage section, the counter-balancing boom section is provided with a ballast box 230 which is movable longitudinally along the counter-balancing boom section. To this end, the ballast box is provided with a plurality of upstanding rollers 232, as shown in FIGURE 1, on each side thereof for engagement within the horizontally spaced longitudinal members 168 and 170 which form tracks within which the rollers seat.

Any suitable means may be provided for effecting movement of the ballast box along the counter-balancing boom section. As shown in FIGURE 1, the outer end of the boom section 166 has a pulley 234 mounted thereon about a transverse horizontal axis around which a cable 236 is trained. One end of the cable is connected to the adjacent end of the ballast box 230 and the opposite end extends around a winch 238, of conventional construction (see FIGURE 3), and then is connected to the opposite end of the ballast box. It will be seen that by suitably actuating the winch 238, the ballast box can be adjusted to any longitudinal position along the counter-balancing boom section and maintained therein.

Referring now more particularly to FIGURES 14-23, the carriage assembly 14 comprises a carriage frame, generally indicated at 240, which is suspended from the tracks on the operative boom section provided by the longitudinal members 158 and 160 for longitudinal sliding movement along the latter, a pipe gripping assembly, generally indicated at 242, and a raising and lowering linkage mechanism, generally indicated at 244, between the carriage frame 240 and the pipe gripping assembly 242 for guiding the latter in a predetermined path between raised and lowered positions with respect to the boom, the mechanism 244 including counter-balancing means, hereinafter to be more fully described, sufficient to effect movement of the pipe gripping assembly 242 into its raised position when the latter is open but insufficient to maintain the pipe gripping means 242 in such raised position when the latter is in engagement with a pipe section. The mechanism 244 is also provided with a latch means, hereafter to be more fully described, for selectively retaining the pipe in the gripping assembly 242 in its raised position when engaged with a pipe section.

As best shown in FIGURES 14-17, the carriage frame 240 includes a pair of horizontally spaced, longitudinally extending frame members 246 and 247 rigidly interconnected by a pair of spaced transversely extending frame members 248 and 249. Suitable diagonal braces 250 may be provided, if desired, to strengthen the frame. Rigidly secured to the forward frame member 248 adjacent each longitudinal frame member is a vertical bar or bracket 252 having a roller 253 journalled on the upper end thereof above the main frame members and arranged to ride within the track provided by the associated longitudinal member of the operative boom section. Extending upwardly from the rear frame member 249 adjacent each longitudinal frame member is a bar 254 carrying similar rollers 255. In addition, a relatively short bar 256 extends upwardly and inwardly from each longitudinal frame member intermediate the ends thereof and a roller 258 is journalled on the upper end thereof for engagement with the lower outer surface of the associated longitudinal frame member of the boom section.

The raising and lowering mechanism 244 includes a transversely extending tube 262 having a pair of upstanding lugs 264 (see FIGURES 15 and 19) rigidly secured to the upper surface thereof and pivotally interconnected with the lower end of the brackets 252. Mounted on each end of the tube 262 and rigidly secured thereto, as by welding or the like, is a bar 266. A pair of elongated outwardly converging arms 268 are rigidly secured to opposite ends of each bar 266 adjacent their divergent ends. The upper end of a standard 270 is pivotally mounted, as indicated at 272, to the outer converging ends of each pair of arms 268, the standards 270 carrying at their lower end the pipe gripping assembly 242.

Figure 18:
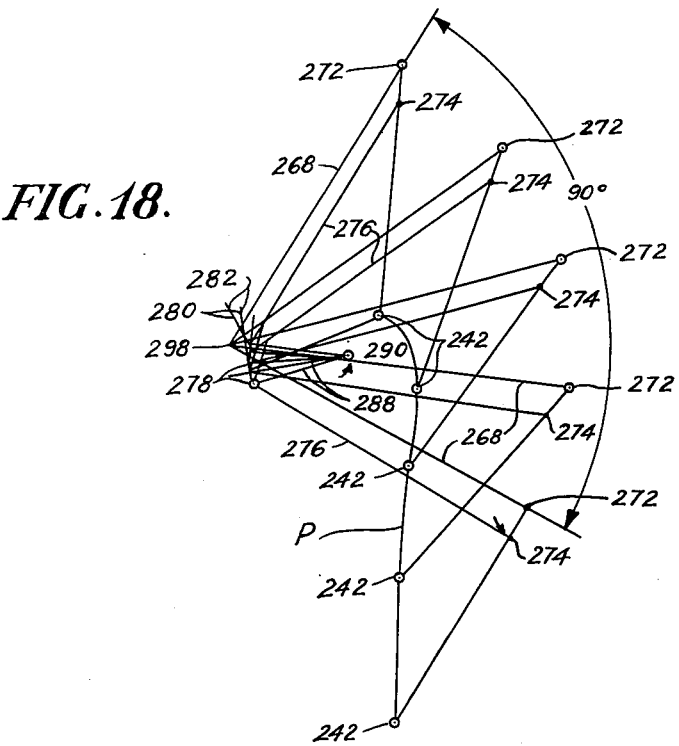
FIGURE 18 is a diagrammatic view illustrating the path of travel of the pipe gripping assembly.

In order to maintain the pipe gripping assembly 242 carried by the lower end of the standards 270 through a fixed predetermined path between raised and lowered positions, as schematically shown in FIGURE 18, each standard 270 has pivoted thereto at a point spaced from the pivot 272, as indicated at 274, one end of an adjustable stabilizing rod or bar 276. The opposite end of each stabilizing bar 276 is pivotally connected, as at 278, to a lever arm 280 intermediate the ends thereof. The upper end of each lever arm 280 is pivotally connected, as at 282, to the upper end of a bar 284 rigidly secured, as by welding or the like, to the associated pair of converging arms 268. Rigidly secured, as by welding or the like, between the lower ends of the lever arms 280, is a bar 286 which provides a means for an operator to manually effect the movement of the carriage assembly along the tracks on the operative boom section, when desired.

A second lever arm 288, forming with the associated arm 280 a toggle linkage, has one end connected at each pivot 278 between the associated stabilizing bar 276 and lever arm 280, and its opposite end pivotally mounted as at 290, to the lower end of a depending bracket 292 rigidly secured at its upper end to the associated longitudinal frame member of the carriage frame 240 and suitably braced, as by a diagonal brace 294 extending between the lower end of the bracket and the associated longitudinal frame member 246. If desired, the entire structure can be additionally braced by diagonal brace members 296 rigidly secured to each longitudinal frame member and extending downwardly for pivotal connection with the lug 264 on a common pivotal axis with the brackets 266, as indicated at 298. A connecting bar 300 is rigidly interconnected between the ends of the arms 288 adjacent the depending brackets 292 to add additional strength.

In order to provide the counter-balancing effect to the raising and lowering means noted above, a pair of counter-balancing springs 302 are provided between the carrier frame 240 and the arms 268 in a position to resiliently urge the latter to swing upwardly about their pivotal axis indicated at 298. To this end, one end of each spring 302 is connected, as by connecting links 304, to the lower end of a lug 306 which is rigidly secured to the tube 262 in depending relation adjacent an end thereof. The opposite end of each spring is connected with a rod 308 which extends through an apertured lug 310 rigidly secured to the transverse frame member 249. As best shown in FIGURE 17, the end of each rod 308 extending through the associated lug 310 is threaded and has an adjusting nut 312 mounted thereon which can be turned to adjust the tension in the associated spring 302.

Mounted between the springs 302 in general alignment therewith is a dampening cylinder or dashpot unit, indicated at 314. This unit includes a cylinder 316 having one end pivoted to the transverse frame member 249, as indicated at 318, and the usual piston rod 320 extending outwardly from its opposite end. The piston rod carries a piston (not shown) on the end thereof disposed within the cylinder in the usual manner. The outer end of the piston rod 320 is pivotally connected as at 322 to a lug 324 rigidly secured to the central portion of the tube 262 and extending outwardly therefrom. The cylinder is filled with a suitable fluid, such as oil or the like, and is provided with an external bypass and an adjustable valve 326 connected between opposite ends thereof for effecting a passage of the fluid from one side of the piston to the other.

Figure 20:
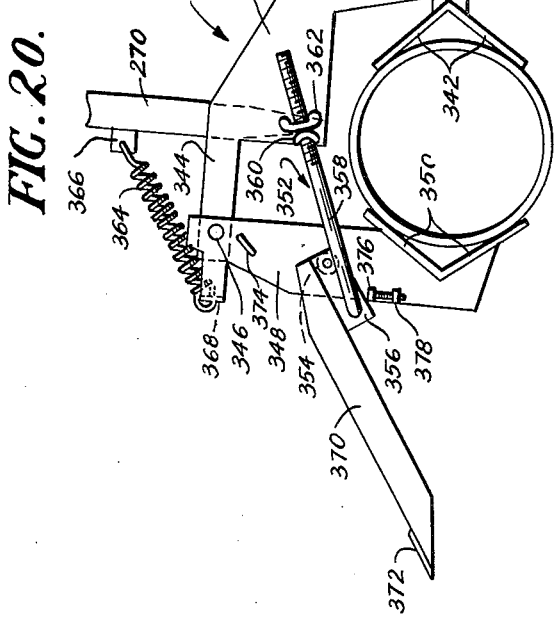
FIGURE 20 is a view similar to FIGURE 19 showing the jaws in their closed position.

Referring now more particularly to FIGURES 19 and 20, the pipe gripping assembly comprises a fixed pipe jaw carrying bracket 328 rigidly secured, as by welding or the like, to the lower end of each standard 270. Preferably, a connecting tube 330 is rigidly interconnected between the pair of brackets 328 adjacent the lower end of the standards. Each bracket includes a downwardly extending arm 332 having its lower end apertured to receive a pivot pin 334 which is arranged to selectively effect a connection between the lower end of each arm 332 and a bar 336 having a plurality of apertures 338 formed therein to selectively receive the pin 334. A stop lug 340 is rigidly carried by each arm 332 to limit the pivotal movement of the bar 336 with respect to the arm 332 about the axis of the pin 334. An angular, outwardly diverging plate 342 is rigidly secured adjacent its apex to the bar 336 and provides a pipe engaging jaw which is operable to receive pipes of various sizes.

Each bracket 328 also includes a second arm 344 extending outwardly thereof in a generally horizontal position. The outer end of each arm has pivotally mounted thereon, as indicated at 346, the upper end of a pivoted jaw carrying bracket 348. The lower end of each bracket 348 has rigidly secured thereto an angular outwardly diverging plate 350 similar to the plate 342 and positioned in general opposition thereto so that a pipe can be gripped therebetween. The jaws 350 on the pivoted brackets 348 are moved toward and away from the jaws 342 on the fixed brackets 328 by an over-center toggle linkage, generally indicated at 352.

The toggle linkage comprises an elongated transversely extending pipe 354 extending between the central portions of the pair of pivoted jaw attaching brackets 348 and journalled in appropriate apertures formed therein. Rigidly secured to each end of the pipe 354 is one end of a link 356, the outer end of which is pivotally connected with a rod 358 forming the second link of the toggle linkage. Each rod 358 extends through an arcuate lug 360 rigidly secured to the associated fixed jaw attaching brackets 328. Preferably, the end of each rod 358 extending through the lug 360 is threaded to receive a wing nut 362 which engages the associated lug 360. A coil spring 364 is connected between a lug 366 rigidly secured to the lower portion of each standard 270 and an arm 368 formed on each pivoted jaw attaching bracket 348.

One of the links 356 has one end of a foot lever 370 rigidly secured thereto as by welding or the like. The opposite end of the foot lever 370 is provided with a foot pedal 372 for engagement by the foot of the operator to effect a movement of the toggle linkage 352 between its two limiting positions shown in FIGURES 19 and 20 and hence effect movement of the jaws 350 and 342 toward and away from each other between opened and closed positions. The movement of the jaws apart is limited by means of a stop lug 374 rigidly secured to the pivoted attaching bracket 348 in a position to engage one surface of the foot lever 370 as shown in FIGURE 19. In this figure, it will be noted that the pivotal interconnection between the toggle links 356 and 358 is disposed on one side of a plane passing through the pivotal axis of the pipe 354 and the connection of the wing nut 362 with the lugs 360 and the springs 364 resiliently maintain the toggle linkage in the limiting position shown. When the jaws are moved into their opposite limiting position, as shown in FIGURE 20, the links 356 are arranged to engage stops in the form of set screws 376 threadedly engaged within lugs 378 formed on each bracket 348. In this position, it will be noted that the pivotal interconnection between the toggle links 356 and 358 is now disposed on the opposite side of the plane passing through the axis of the pipe 354 and the point of connection between the wing nuts and lugs 360 and the springs 364 serve to maintain the jaws in such limiting position. It will be readily understood that by adjusting the position of the stop screws 376 as well as the position of the wing nuts, 362, the toggle linkage is susceptible of simple adjustment. In addition, to further provide adjustability for various sizes of pipes, the pin 334 may be inserted selectively in any one of the holes 338 formed in the bar 336.

As previously indicated, the counter-balancing springs 302 of the raising and lowering mechanism 244 are adjustable so that when no pipe is carried between jaws 342 and 350, the pipe gripping assembly 242 will be spring biased into its raised position. The pipe gripping assembly 242 can be moved into its lowered position by the operator pulling down on the pipe 354, standard 270, or arms 268 against the action of the counter-balancing springs 302. However, when the jaws 342 and 350 are moved together into engagement with a pipe, the counter-balancing springs 302 do not have sufficient strength to move the jaw gripping assembly into its raised position due to the added weight of the pipe carried thereby. Consequently, it is necessary for the operator to manually move the pipe gripping assembly 242 into its raised position. In order to maintain the pipe gripping assembly in its raised position when a pipe is carried thereby, there is provided a latch assembly generally indicated at 380.

As best shown in FIGURES 21–23, the latch assembly 380 comprises a bell crank 382 having a pair of arms 384 and 386. The bell crank 382 is pivoted adjacent the interconnection of the arms 384 and 386, between a pair of upstanding lugs or brackets 388 rigidly secured to the central portion of the transverse frame member 249, as indicated at 390. The lower end of the arm 384 is provided with a cut out, as indicated at 392, and has a latch plate 394 rigidly secured to the lower edge thereof. A coil spring 396 is mounted between a lug 398 rigidly secured to the arm 384 intermediate its ends and an L-shaped bracket 400 rigidly secured to the adjacent lug 388 so as to resiliently urge the bell crank 382 and hence the arm 384 in a clockwise direction as viewed in FIGURES 22 and 23. It will be noted that the arm 384 is normally urged into a limiting position in engagement with the transverse member 249 by the action of the spring 396.

As best shown in FIGURE 16, the connecting pipe 330 of the pipe gripping assembly 242 moves into a position adjacent the transverse frame member 249 when the pipe gripping assembly 242 is disposed in its raised position. A lug 402 is rigidly secured to the central portion of the pipe 330 and extends radially outwardly therefrom. The lug 402 is arranged to engage the latch plate 394 and to pivot the latch arm 384 against the action of the spring 396 and hence move past the latch plate into a position within the cutout 392 and above the latch plate, as shown in FIGURE 22. In this way the latch plate 394 serves to maintain the pipe gripping assembly in a raised position.

A carriage traversing mechanism, generally indicated at 404, is provided for effecting the longitudinal movement of the carriage assembly 14 along the operative boom section 156 from a point thereon adjacent the vehicle to a point adjacent the outer end thereof. The mechanism 404 comprises an electric motor, 406, which is mounted on the central boom section 124 by any suitable means such as an attaching bracket or strap 407 (see FIGURE 9). The shaft of the motor 406 extends downwardly and has a sheave or pulley 408 fixedly mounted on the lower end thereof. A cable 410, is trained about the sheave 408 throughout a substantial portion of the periphery thereof, as shown in FIGURES 3 and 7, and a second sheave 412 (FIGURES 11 and 13) suitably mounted on the outer end of the operative boom section 156 for rotation about the vertical axis. The cable 410 has its opposite ends connected to the carrier frame in a manner hereinafter to be more fully described. As needed, idler sprockets 418 can be suitably mounted in longitudinally spaced relation along the operative boom portion.

Figure 24:
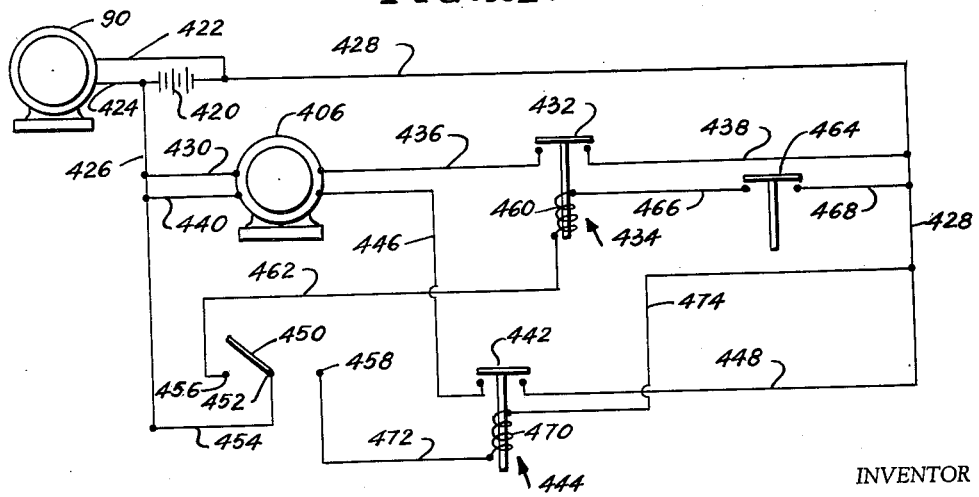
FIGURE 24 is a wiring diagram of the circuit controlling the carriage moving means.

The motor 406 is controlled by an electric circuit which is schematically illustrated in FIGURE 24. The circuit includes a battery 420 which is connected through suitable leads 422 and 424 in series with the electric generator 90 mounted on the tractor unit of the vehicle as previously described. Preferably, the battery is suitably carried on the central portion of the boom assembly as is clearly illustrated in FIGURES 1-3 and 7.

Preferably, the motor 406 is of the reversible type which is appropriately wired so that by alternately connecting the various leads thereto through different circuits the rotation thereof can be reversed.

In order to effect movement of the carriage assembly inwardly from a position adjacent the outer end of the operative boom section 156, the motor 406 is connected between two main lines 426 and 428 connected to opposite poles of the battery. As shown in FIGURE 24, this circuit includes a lead 430 from the main line 426 to the motor 406 and a switch contact 432 of a relay 434 connected in series between the opposite side of the motor 406 and the main line 428, as by leads 436 and 438. In a like manner, the motor 406 is reversed to effect an outward movement of the carriage assembly 14 through a circuit which includes a lead 440 connected between the main line 426 and one side of the motor 406 and a switch contact 442 of a relay 444 connected in series between the opposite side of the motor and the main line 428, as by leads 446 and 448. It can be seen that the relays 434 and 444 control the actuation of the reversible motor 406.

The relays 434 and 444 are controlled by a switch 450 which may be of the double throw type, having a central contact 452 connected in series with the main line 426, as by a lead 454. The switch 450 also includes opposed contacts 456 and 458 which are connected in series respectively with the relays 434 and 444. The relay 434 includes a coil 460 having one side thereof connected to the switch contact 456, as by a lead 462, and its opposite side connected in series with a switch, generally indicated at 464 to the main line 428, as by leads 466 and 468. The relay 444 includes a coil 470 having one side connected with the switch contact 458, as by the lead 472, and its opposite side connected with the line 428, as by lead 474.

Figure 26:
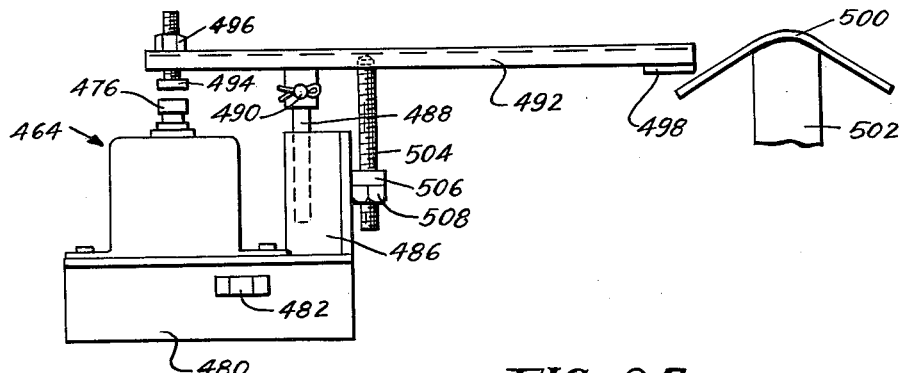
FIGURE 26 is a side elevational view of the switch shown in FIGURE 25 illustrating the manner in which the same is actuated.
Figure 25:
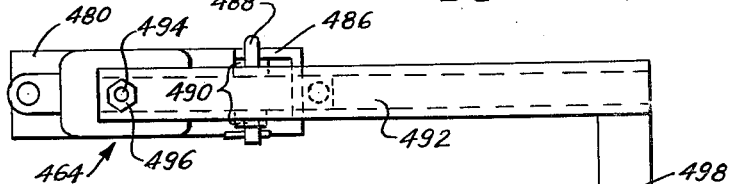
FIGURE 25 is an enlarged top plan view of one of the switches of the carriage moving means controlling circuit.
Figure 27:
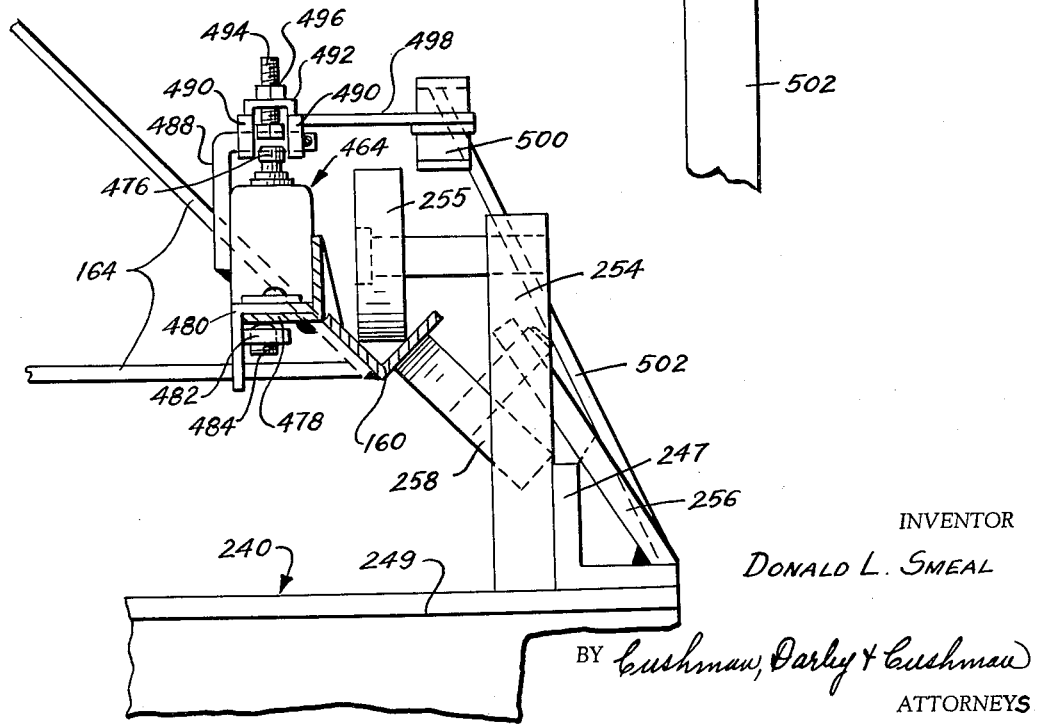
FIGURE 27 is an end view of the switch shown in FIGURE 25 illustrating the manner in which the same is mounted on the boom.

Referring now more particularly to FIGURES 25-27, the switch 464 is preferably of the push on-push off type. As shown in FIGURE 26, the switch may include a plunger 476, which is spring urged outwardly and when pushed successively operates to alternately interrupt and complete the circuit. This switch is mounted for longitudinal adjustment on the operative boom section 156 at a position thereon near the vehicle. As best shown in FIGURE 27, a rail 478, preferably in the form of an angle iron, is rigidly connected with the operative boom section in a position above the longitudinal frame member 160 thereof, by any suitable means. The switch is provided with a mounting plate 480 which also is preferably in the form of an angle iron arranged with one flange supporting the switch and the other flange extending downwardly therefrom. A lug 482 is rigidly secured to the downwardly extending flange in spaced parallel relation to the horizontal flange to receive a flange of the rail 478 therebetween. The lug 482 is suitably apertured to receive a set screw 484. It can be seen that by turning the set screw the position of the switch can be adjusted longitudinally with respect to the operative boom section 156.

Rigidly secured to the mounting plate 480 adjacent the switch 464 is an upstanding bar 486 preferably of angle iron construction. An L-shaped rod 488 has its lower end rigidly attached to one flange of the bar and its horizontally extending upper end pivotally interconnected with a pair of lugs 490 depending from a downwardly facing channel shaped lever arm 492 intermediate the ends thereof. One end of the lever arm 492 extends over the switch plunger 476 and has a bolt 494 threaded therein and positioned so that the head thereof will engage the plunger. The bolt 494 is locked in any position of adjustment by a nut 496 threadedly engaged thereon which may be tightened into contact with the upper surface of the lever arm 492.

The opposite end of the lever arm 492 has a contact bar or cam follower 498 extending laterally therefrom for engagement by a cam 500 suitably mounted on the carriage frame 240. The cam 500 is preferably in the form of an upwardly convex plate rigidly secured, as by welding or the like, to the upper end of a bar 502, the lower end of which is rigidly secured to the longitudinal frame member 247 as is clearly shown in FIGURE 27.

It will be seen that the pivotal connection of the lever 492 is disposed closer to the end of the lever carrying bolt 494 than the end thereof carrying the cam follower 498. Thus, the lever is naturally biased to pivot in a clockwise direction as viewed in FIGURE 26. In order to limit this pivotal movement and to adjustably maintain the cam follower in a position to engage the cam 500, a stop rod 504 is provided. This stop rod has its lower end threaded in a lug 506 rigidly secured to the other flange of the bar 486 and its upper end disposed in a position to engage the lower surface of the lever arm. A nut 508 is threaded on the rod to lock the latter in any vertical position of adjustment.

It can be seen that engagement of the cam 500 with the cam follower 498 will effect a pivotal movement of the lever arm 492 which in turn will depress the switch plunger 476. When the carriage is moving inwardly on the operative boom section toward the vehicle this depression of the plunger 476 will have the effect of interrupting the circuit to the motor 406 and thus stop the movement of the carriage. Since the position of the switch is longitudinally adjustable, the position at which the carriage is stopped can also be adjusted longitudinally. Preferably, the switch is positioned so that the carriage will have some additional movement toward the vehicle after the switch has been actuated. That is, the movement of the carriage begins to decelerate, the moment the switch is actuated and the motor is turned off. As best shown in FIGURES 16 and 28 the exact position at which the movement of the carrier assembly 14 is halted is determined by a stop bar 510, rigidly secured to the longitudinal member 160 of the operative boom section at a position adjacent the vehicle and extending laterally outwardly therefrom for engagement with the upper portion of the bracket 252 which carries the roller 253 adjacent frame member 247.

Rigidly secured to the longitudinal frame member 247 of the carriage frame 240 is an upstanding bracket 512 pivotally receiving at its upper end a bell crank 516. The bell crank includes an upwardly extending arm 518 provided with a plurality of vertically spaced apertures 520. A connecting link 522 is selectively mounted within one of the apertures 520 as by a pin or the like mounted intermediate its ends. The connecting link 522 has one end of the cable 410 connected thereto as indicated at 524 and the opposite end of the cable connected thereto as by a turnbuckle 526.

As best shown in FIGURE 28, the bell crank 516 also includes an arm 528 extending outwardly from the pivot 514 at an angle with respect to the arm 518. Rigidly secured to the outer end of the arm 528 is a cam follower plate or locking bar 530 which is arranged to engage a cam plate or lock 532 suitably fixed to the boom adjacent the stop bar 510. The cam plate 532 preferably includes an upwardly sloping generally horizontal portion 534 and terminates in a downwardly turned vertical portion 536 disposed on the end thereof adjacent the vehicle.

It can be seen that after the motor has been cut off by the operation of the switch 464, the carriage frame will continue to move until stop 510 is engaged. It will also be noted that during this movement the momentum of the carriage assembly is greater than the momentum of the motor 406 and hence the lever arm 528 will be moved in a counter-clockwise direction about the pivot point 514 into the dotted line position as viewed in FIGURE 28. When the carriage frame is stopped by the engagement of the bracket 252 with the stop 510, the momentum of the motor 406 will continue to move the cable 410 which in turn effects a pivotal movement of the bell crank about its pivotal axis 514 in a clockwise direction as viewed in FIGURE 28, thereby moving the locking plate or cam follower 530 into a locked position in engagement with the downturned vertical end surface 536 of the cam 532. In this way, the carriage assembly 14 is locked into its innermost position.

The position in which the carriage is locked determines the position at which it is desired to deposit the pipe carried by the pipe gripping assembly 242. To this end, means is provided for unlatching the pipe gripping assembly 242 from its raised position with respect to the carriage frame to thereby permit the pipe to be lowered by the raising and lowering mechanism 244 due to the added weight of the pipe, as explained above. The unlatching means preferably comprises a cam plate 538 rigidly secured to the boom in the central portion thereof at a longitudinal position thereon sufficient to engage a cam follower plate 540 mounted on the outer end of the arm 386 of the latch bell crank 382. As best shown in FIGURES 16 and 23, the engagement of the cam 538 with the cam plate 540 effects a pivotal movement of the bell crank 382 in a counter-clockwise direction as viewed in FIGURE 23 so that the latch bar 394 moves from beneath the lug 402 and permits the pipe gripping assembly 242 to lower under the weight of the pipe, by means of the raising and lowering mechanism 244.

A releasing mechanism, generally indicated at 542, is provided for releasing the pipe gripping assembly 242 when the latter has reached a predetermined vertical position below its raised position so as to open the jaws and deposit the pipe gripped therein on the ground adjacent the vehicle. As best shown in FIGURES 14, 16, 17 and 29–32, the releasing mechanism 542 comprises a toggle linkage actuating rod 544 having its lower end pivotally connected with the link 356 opposite from the foot lever 370, as indicated at 546. The upper end of the rod 544 is adjustably pivotably connected to the lower end of a lever 548, as indicated at 550. The lever 548 is mounted on one of the standards 270 by a mounting member 552 which is preferably in the form of an angle iron rigidly secured to the standard as by lugs 554. Pivotally connected, as at 556, to the lower end of the mounting member 552, is one end of a connecting link 558, the other end of which is pivotally connected to the lever 548 at a position spaced above the actuating rod 544, as indicated at 560. A spring 562 suitably connected between the mounting member 552 and the lever above the pivot 560 serves to resiliently urge the latter in a counter-clockwise direction as viewed in FIGURE 29. This movement of the lever is limited by means of a stop bar 564 rigidly secured to the mounting member and having its outer end extending laterally, as indicated at 566, for engaging a latch bar element 568 rigidly secured to lever 548.

It will be seen that when the pipe gripping assembly 242 is in engagement with a pipe, an upward movement of the lever 548 and actuating rod 544 will move the toggle linkage from one limiting position to the other and hence open the jaws to permit the pipe to be deposited on the ground. This upward movement is effected by means of a bell crank 570 which is pivoted, as at 572, to the upper end of the mounting member 552. The bell crank 570 includes an outwardly extending arm 574 having an end portion arranged to engage the upper end 576 of the latch bar element 568, which upper end extends laterally in a substantially horizontal direction inwardly toward the bell crank 570.

The bell crank 570 also includes an arm 578 which receives one end of a coil spring 580, the opposite end of which is connected with an inturned end 582 of the bar 564. The spring 580 tends to move the bell crank 570 in a counter-clockwise direction as viewed in FIGURE 29 and this movement is limited by a stop lug 584 rigidly secured to the mounting member 552 in a position to engage the bell crank arm 578.

The bell crank 570 also includes an arm 586, the outer end portion of which is arranged to be engaged by the head of a bolt 588 threadedly engaged within the outer end of a bar 590. The inner end of the bar 590 is rigidly secured to the converging end of the associated arms 268 of the raising and lowering mechanism 244 as by a plate 592 or the like welded or otherwise suitably fixed between the arms 268 and the bar 590. The bolt 588 is locked into any desired position of longitudinal adjustment by a nut 594 threaded on the outer end thereof for engagement with the bar 590.

The inner end portion of the arm 586 of the bell crank 570 is arranged to be engaged by the head of a bolt 596, threaded in a lug 598 fixed to the converging ends of the arms 268 on the opposite side of the pivot 272 thereof, as by a bar 600. As before, the bolt 596 can be locked into any position of longitudinal adjustment by a nut 602 threaded on the outer end thereof for engagement with the lug 598.

The releasing mechanism 542 has the effect of tripping the toggle linkage 352 when the pipe gripping assembly 242 has reached a predetermined position below its raised position as will hereinafter be more fully explained. As explained above, the counter-balancing springs 302 are of sufficient strength to effect movement of the pipe gripping assembly 242 into its raised position when the jaws are open and the pipe has been released. Thus, the raising and lowering mechanism 244 will effect a movement of the pipe gripping assembly into its raised position in response to the release of the pipe.

Means is provided for actuating the motor 76 of the tractor unit 62 to propel the vehicle forward in response to the movement of the pipe gripping assembly 242 into its raised position. As noted above, the transmission of the power of the engine 76 to the driving wheel 70 of the vehicle is controlled by the clutch assembly 80 previously described. This clutch assembly includes an actuating lever 604 which is normally spring loaded, as by a spring 606, to maintain the clutch 80 in a position to disengage the power of the engine from the driving wheel 70 of the vehicle.

As best shown in FIGURES 35 and 37, the upper end of the clutch lever 604 has one end of a clutch actuating cable 608 connected thereto and the opposite end of the cable is connected with the lower end of a downwardly extending arm 610 of a bell crank 612. The bell crank is pivotally mounted to the lower end of a mounting bracket 614, rigidly secured to the central portion of the forward transverse frame member 18 of the horizontal frame section 16 of the vehicle. It will be noted that the spring 606 resiliently urges the bell crank 612 about its pivot in a counter-clockwise direction, as viewed in FIGURE 35. This movement is limited by means of a stop bolt 616 extending upwardly from a horizontally outwardly extending arm 618 of the bell crank 612 in a position to engage the under-surface of the transverse frame member 18. Pivotally connected with the outer end of the arm 618 is the lower end of a connecting rod 620, the upper end of which is pivotally connected with the outer end of a lever arm 622. The inner end of the lower arm is pivoted to pin 624 rigidly secured to the frame member 18 and extending laterally therefrom.

A roller 626 is journalled on the outer end of the lever arm 622 above the pivotal connection of the connecting link 620 thereon and is arranged to be selectively engaged by either one of a pair of downwardly concave cam plates 628 carried on one end of a pair of rocker arm assemblies, generally indicated at 630.

Each rocker arm assembly 630 includes a tubular element 632 journalled on a stub shaft 634 extending laterally outwardly from an associated longitudinal frame member 126 and 128 of the central boom section. The upper surface of the tubular element 632 is rigidly secured, as by welding or the like, to an elongated rocker arm member 636, one end of which has the associated cam plate 628 rigidly secured thereto in depending relation and the opposite end of which has a stop plate 637 depending therefrom. A vertical rocker arm frame member 638 has its lower end rigidly secured to the central portion of the member 636 and its upper end rigidly secured to the apex of an angularly bent elongated frame member 640, the ends of which are rigidly secured to the ends of the member 636 respectively. A spring 642 is connected between the associated boom section frame member and the frame member 636 on the opposite side of the shaft 634 from the cam plate 628 so as to tend to move the rocker arm assembly about the shaft 634 in a clockwise direction as viewed in FIGURE 35. This movement is limited by means of a stop bolt 644 threadedly engaged within a lug 646 rigidly attached to the associated frame member of the boom section and extending laterally outwardly therefrom. The head of the bolt 644 is positioned in the path of travel of the member 636 so as to be engaged by the lower surface thereof. Preferably, the bolt is arranged to be locked into various positions of longitudinal adjustment by any suitable means such as locking nut or the like.

The end of each rocker arm assembly 630 is arranged to be engaged by an associated actuating arm assembly, generally indicated at 648, embodied in the carriage assembly 14. As best shown in FIGURES 14, 16, 17, 33, 34 and 36, each assembly 648 includes an outer plate 650 having a transversely extending lug 652 rigidly secured to one surface thereof, the lug being apertured to receive the outer threaded end of a stem 654 rigidly carried by the outer end of a lever arm 656. A pair of nuts 658 are threadedly engaged on the stem 654 on opposite sides of the lug to position the plate 650 in any desired position of longitudinal adjustment with respect to the lever arm 656.

The lower end of each lever arm 656 is pivotally connected, as at 660, to the upper end of an upstanding lug or bracket 662 rigidly secured to the tubular member 262 of the raising and lowering mechanism 244. Each lever arm 656 is spring urged into a substantially vertical position by means of a spring 664 connected between the lever arm and the associated longitudinal frame member of the carriage frame 240. As best shown in FIGURE 17 the lever arms 656 are disposed outwardly of the associated carriage frame member.

*Operation*

The present apparatus is particularly suited for moving irrigation pipe from a previous position of use to a new position of use laterally remote therefrom. As noted above, in the normal use of a lateral conduit assembly, spraying is carried out for a period of six to eight hours and then it is necessary to dismantle the assembly and to move it to the next position of use, which in a corn field is spaced laterally approximately 18 rows away. Thus, the lateral conduit assembly will be dismantled and with the use of the present apparatus it is contemplated that the longitudinal center of gravity of the pipe sections will have a suitable marking placed thereon so that the operator can readily determine the proper position to which the pipe gripping assembly 242 should be engaged on the pipe sections. In general, the procedure to be followed consists in moving each successive pipe section from its previous position of use to a new position of use laterally remote therefrom.

The operator is stationed at a position between rows of corn adjacent the pipe sections which have been previously used. The vehicle 10 is stationed approximately 18 rows from the pipe sections with the driving wheel 70 of the tractor unit 62 riding in a furrow between the rows of corn and the rear wheels 50 in the furrows on opposite sides of the first mentioned furrow. The steering mechanism 92 is riding in the central furrow ahead of the driving wheel 70.

For purposes of convenient description it will be assumed that the carriage assembly 14 is disposed adjacent the outer end of the operative boom section 156 in which case the end stand assembly 186 is in its lowermost position with the central portion of the runner 206 in ground engagement with the furrow alongside the disassembled pipe sections. In this regard it will be noted that by means of cam levers 198 the end stand can be adjusted to any desired longitudinal position adjacent the outer end of the operative boom section 156. The pipe gripping assembly 242 is maintained in its raised position by the action of the counter-balancing springs 302 with the jaws thereof open.

In general, the operation of the present apparatus can be simplified by considering the same in five distinct stages. In the first stage, the pipe is engaged with the carriage assembly disposed on the outer end of the operative boom section. Second, the carriage assembly with a pipe section carried thereby is moved inwardly along the boom. Third, the pipe section is deposited at a position adjacent the vehicle. Fourth, the vehicle is moved forwardly to a position adjacent the next successive pipe section. Fifth, the carriage assembly is moved outwardly along the operative boom section into a position to pick up the next successive pipe section.

*Eangaging the Pipe Section*

With the apparatus in the position indicated above, the operator initiates the operation by gripping pipe 354 or standard 270 and thence on to arms 268 so as to move the pipe gripping assembly 242 downwardly into a position adjacent the center of gravity of the pipe section to be moved, as shown in FIGURE 14. The carriage assembly 14 is then manually moved along the tracks on the operative boom section until the jaws 342 and 350 fit over the pipe section. The operator then steps on the foot pedal 372 and pushes down to move the jaws into clamping engagement with the pipe section so that the pipe gripping assembly 242 moves from the position shown in FIG- URE 19 to the position shown in FIGURE 20. In this regard it will be noted that the toggle linkage 352 is moved into an over-center relation so as to hold the jaws in the closed pipe engaging position. In addition, it will be noted that when the jaws are closed, the actuating rod 544 of the releasing mechanism 542 is moved downwardly which, in turn, effects a downward movement of the lever 548 bringing the end 576 of the latch element 568 into a position below the bell crank arm 574 as shown in the dotted lines in FIGURE 29.

Figure 30:
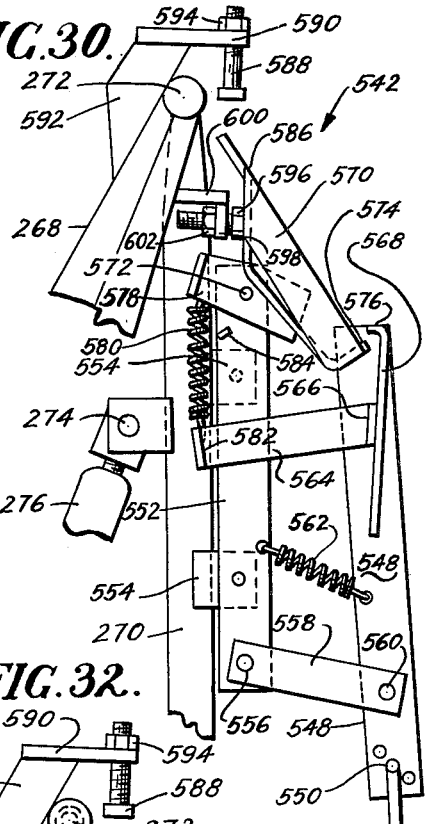
FIGURE 30 is a view similar to FIGURE 29 showing the position of the parts after the pipe gripping assembly has been moved into its raised position with the jaws closed.
Figure 31:
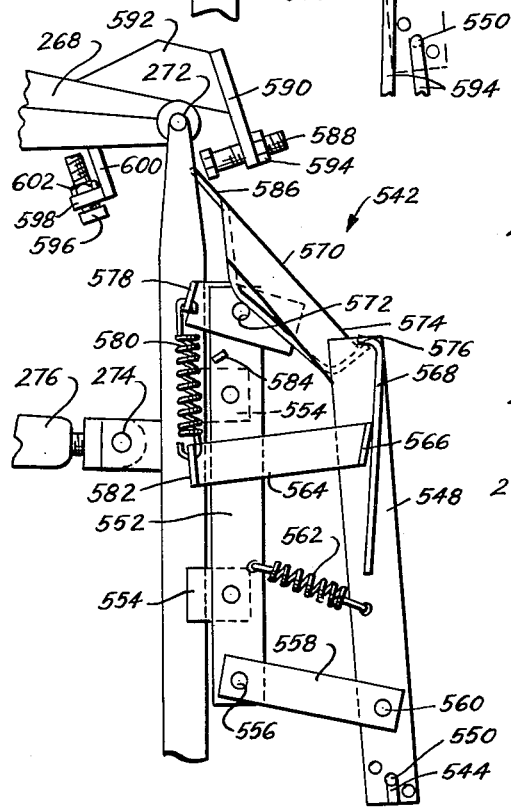
FIGURE 31 is a view similar to FIGURE 29 showing the position of the parts just prior to the release of the jaws during the downward movement of the pipe gripping assembly.
Figure 32:
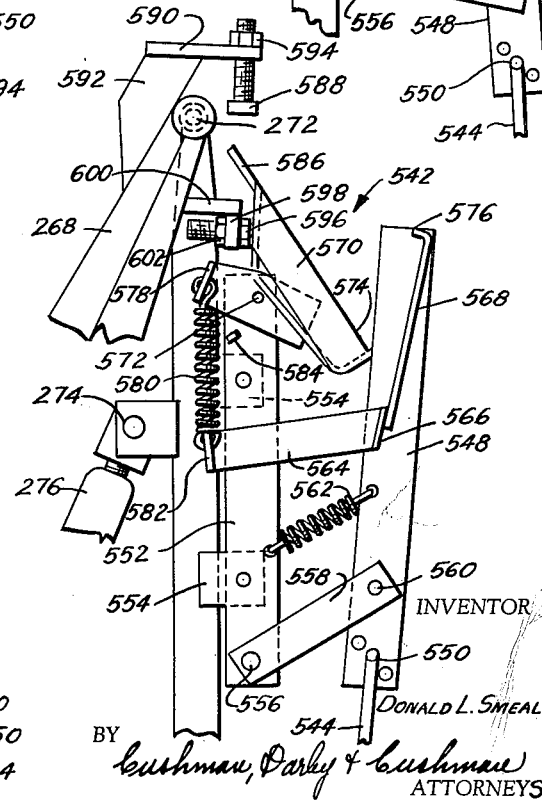
FIGURE 32 is a view similar to FIGURE 29 showing the position of the parts after the jaws have been released and the pipe gripping assembly moved into its raised position.

Since the counter-balancing springs 302 of the raising and lowering mechanism 244 are not sufficient to raise the pipe gripping assembly 242 with the weight of the pipe section added thereto, the operator then moves the pipe gripping assembly into its raised position until the lug 402 moves past the latch bar 394, as shown in FIGURE 22, so as to retain the pipe gripping assembly 242 in its raised position. During this movement of the pipe gripping assembly 242, the stop nut 596 carried by the converging arms 268 of the raising and lowering mechanism 244 engages the inner end portion of the bell crank arm 586 so as to effect the movement of the bell crank arm end 574 into a position below the end 576 of the latch bar element as shown in FIGURE 30.

*Inward Movement of the Carriage Assembly*

With the pipe gripping assembly 242 latched into its raised position and the releasing mechanism 542 disposed in the position indicated above, the switch 450, which is conveniently mounted on the member 202 of the end stand assembly 186 as shown in FIGURES 10 and 12, is actuated by the operator to an "in" position thus completing the circuit to the coil 460 of the relay 434. As shown in FIGURE 24, this circuit is connected across the main lines 426 and 428 through a lead 454, contacts 452 and 456 of the switch 450, lead 462, coil 460, lead 466, switch 464, and lead 468. As noted above, the switch 464 is of the push on-push off type and when the carriage is disposed adjacent the outer end of the operative boom section 156, this switch will be closed. It will be seen that by energizing the coil 460, switch contact 432 of the relay 434 will be closed, thus energizing the motor 406 across the main lines 426 and 428 through leads 430, 436 and 438. The energization of the motor 406 effects an inward movement of the carriage assembly through the operation of the cable 410 trained about sheaves 408 and 412 and connected with the carriage assembly.

It will be noted that during the inward travel of the carriage assembly 14, the carriage assembly will reach a point where the weight of the counter-balancing boom section, as determined by the position of the ballast box 230 and the amount of the ballast (e.g. sand or the like) therein, will be greater than the weight of the operative boom section 156 so that as the carriage assembly continues to move inwardly past this point the operative boom section will move upwardly about the pivotal axis 154. This movement causes the central runner portion 206 of the end stand assembly 186 to rise above the ground as shown in FIGURE 12. The ballast box 230 on the counterbalancing boom section is positioned by the winch 238 so that when the carriage assembly is disposed in its innermost position, the operative boom section and end stand is cantilever supported, although the end 208 of the runner 206 will be in engagement with the ground through the aid of the ballast, (e.g. sand or the like) contained within the ballast box 210 of the end stand assembly. Thus the boom in cantilever suspension supports itself and stand except the end stand ballast. The latter serves to limit or restrain the upward travel of the end of the boom so as to maintain a positive relation of the angular movement of boom with the general topography of the field while the boom is cantilever supported, independent of the angular variation of the supporting vehicle relative to the boom that might be caused by the wheels of the vehicle passing over uneven ground and also allowing no tilting action of the supporting vehicle by any boom up or down movement or variations in ground over which vehicle travels.

As the carriage assembly 14 approaches the end of its inward travel the cam plate 500 on the carriage frame 240 engages the cam follower 498 which effects a pivotal movement of the lever 492 about its pivot 490 so that the bolt 494 will engage the plunger 476 of the switch 464 and move the same into an "off" position and thus interrupt the circuit to the coil 460 of the relay 434. When the coil 460 is de-energized the switch contact 432 is opened, interrupting the circuit to the motor 406.

When the motor 406 is de-energized, the movement of the cable 410 is immediately slowed down but the carriage assembly 14 continues to move, due to its momentum. Thus, a relative movement between the carriage and the cable 410 occurs which has the effect of moving the bell crank 516 in a counter-clockwise direction as viewed in FIGURE 28, so as to move the arm 528 into the dotted line position shown. The inward travel of the carriage is halted by the engagement of the bracket 252 with the stop 510 but while the motor has initially slowed down there is sufficient momentum left to effect a further movement of the cable 410 so as to move the bell crank arm 528 back into its solid line position as shown in FIGURE 28, so that the locking plate 530 engages with the downturned end surface 536 of the cam 532 thus locking the carriage in an inwardly disposed position as shown in FIGURE 16.

As the carriage assembly 14 is moved into its inwardly disposed locked position, the plates 650 on the spring biased lever arms 656 will engage the adjacent ends of the rocker arm assemblies 630 and cause the levers 656 to pivot against the action of the springs 664 into the position illustrated in FIGURES 16 and 33.

*Depositing the Pipe Section*

When the carriage assembly reaches its innermost locked position as shown in FIGURE 16, cam plate 540 of the latching bell crank 382 engages the cam plate 538 thus moving the latch plate 394 into the position illustrated in FIGURE 23, which permits the pipe gripping assembly 242 to begin its downward movement as a result of the additional weight of the pipe section carried thereby. It will be noted that the dashpot or dampening cylinder 316 serves to retard the acceleration of the downward movement of the pipe section carried by the pipe gripping assembly 242.

Figure 15:
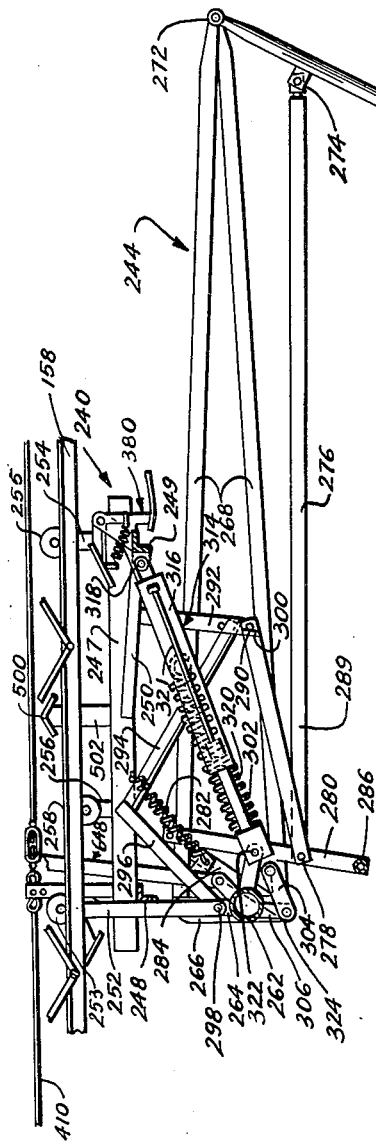
FIGURE 15 is a vertical sectional view of the carriage assembly showing the pipe gripping assembly in an intermediate position and the jaws thereof in their closed position.

During this downward movement the converging arms 268 of the raising and lowering mechanism 244 are moved about their pivot 298 in a clockwise direction, as viewed in FIGURES 15 and 33. As described above, the releasing mechanism 542 is disposed in the position illustrated in FIGURE 30. At a predetermined position of vertical movement of the raising and lowering mechanism 244 below the raised position of the pipe gripping assembly 242, the stop nut 588 will engage the outer end portion of the bell crank arm 586 so that further downward movement of the pipe gripping assembly will effect a counter-clockwise movement of the bell crank 570 about its pivot 572 as viewed in FIGURE 31. This movement will bring the bell crank arm end 574 into engagement with the end 576 of the latch bar element 568, thus causing the lever 548 and the actuating rod 544 to move upwardly with respect to the standards 270 of the raising and lowering mechanism 244. This upward movement of the actuating rod 544, illustrated in FIGURE 31, has the effect of moving the toggle linkage 352 out of its over-center position maintaining the jaws 342 and 350 into engagement with the pipe section as shown in FIGURE 20 into its open over-center position wherein the jaws are open as shown in FIGURE 19.

Figure 29:
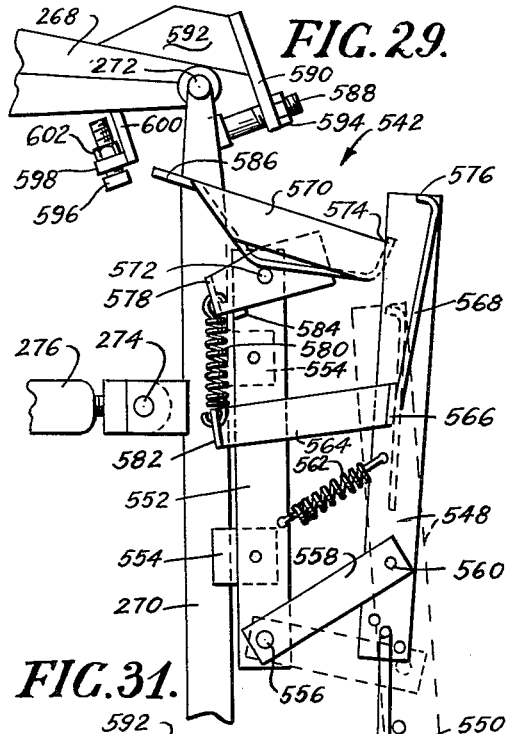
FIGURE 29 is an enlarged fragmentary side elevational view of the releasing mechanism for the pipe gripping assembly showing the position of the parts prior to engagement of the jaws with a pipe section, the position of the parts after the jaws are closed into engagement with the pipe section being shown in dotted lines.

It will be noted that the actuating rod 544 serves merely to move the toggle linkage 352 beyond its closed over-center position and then the spring 364 acts to move the toggle linkage into its open over-center limiting position wherein the stop 374 is engaged and the spring 580 acts to return the bell crank 570 into the full line position shown in FIGURE 29.

As the jaws are opened the pipe section carried thereby is deposited on the ground adjacent the vehicle. It will be noted that there are various adjustments provided whereby the vertical position at which the jaws are opened can be varied. For example, the actuating rod 544 can be disposed within different apertures in the lower end of the lever 548 or the longitudinal position of the stop bolt 588 can be varied. In addition, the pipe gripping assembly itself has various adjustments which can vary the position at which the pipe jaws are opened. For example, the wing nut 362 provides adjustment of the grip of the jaws 342 and 350 on the pipe section and the stop nut 376 provides adjustment on the amount of overcenter lock. Of course, the jaws 342 can be adjusted by inserting the pin 334 in any one of the apertures 338 provided in the bar 336.

It will also be noted that during the downward movement of the pipe gripping assembly 242 the upper end of the plates 650 move into a position beneath the adjacent ends of the rocker arm assemblies 630 and into engagement with the depending plate 637, by the action of the springs 664 as is clearly illustrated in FIGURE 34.

When the pipe section is released in response to the opening of the jaws 342 and 350, the counter-balancing springs 302 of the raising and lowering mechanism 244 cause the pipe gripping assembly 242 to begin movement upwardly into its raised position. During this movement it will be noted that the bell crank 570 of the releasing mechanism 542 is moved into the position illustrated in FIGURE 32, as the result of the movement of the stop nut 596 into engagement with the inner end portion of the bell crank arm 586.

The stabilized movement of the pipe gripping assembly 242 and the manner in which the same is guided constitutes a significant feature of the present invention. As best shown in FIGURE 18, the pipe gripping assembly moves through a path P between its raised and lowered positions. This path is very nearly vertical and is achieved by a linkage mechanism which permits the pipe gripping assembly to be carried laterally along the boom in close relation to the carriage frame. This relationship is particularly important in corn field operation where a low position of the pipe section during its lateral movement might tend to injure the plants. Moreover, the substantially vertical translational movement of the pipe section by the raising and lowering mechanism insures that no injury will result to the plants on opposite sides of the furrow during the raising or depositing operations. Furthermore, this movement also permits deposit closely adjacent the vehicle.

*Forward Movement of the Vehicle*

As noted above, during the upward movement of the pipe gripping assembly 242 from its lowermost position to release the pipe section, the plates 650 are disposed beneath the adjacent ends of the rocker arm assemblies 630 in the position shown in FIGURE 34. As the raising and lowering mechanism 244 effects the raising movement of the pipe gripping assembly 242, the plates 650 will be moved upwardly and carry with them the adjacent ends of the rocker arms so that the latter pivot about the axis of their shafts 634 into the position shown in FIGURE 36. This movement causes a downward movement of the cam plates 628 one of which will engage with the roller 626 which in turn effects the downward movement of the lever 622 and a pivoting of the bell crank 612 about its pivotal connection 614, through the connecting link 620, so that the clutch lever 604 is moved into a position to engage the clutch 60 through the cable 608. It will be noted that the action is possible because the strength of the counter-balancing springs 302 is sufficient to overcome the strength of the clutch spring 606. The engagement of the clutch 80 actuates the driving wheel 70 of the tractor unit 62 through the gear box 82, chain assembly 84 and worm gear unit 86.

During the forward movement of the vehicle it will be noted that the runners 108 engage within the furrow between the corn rows and tend to center themselves therein. The runners are connected with the tractor unit so as to steer the driving wheel 70 and in this way the vehicle is automatically steered along the furrow. It will be noted that the runners are adjustable in width as shown in dotted lines in FIGURE 4 and illustrated in FIGURES 5 and 6, and this adjustment makes it possible to adapt them to various conditions in the furrow. It is also possible to vary the amount of ballast placed in the ballast box 104 for proper results in varying soil conditions.

During the forward movement of the vehicle, the operator walks along the furrow adjacent the end stand assembly 186. As previously noted, the boom with the carriage in its inward locked position is cantilever supported. This allows moving of the entire machine forward to a new position of operation by removing drag resistance on end stand and eliminating side draft on propelling vehicle. In this regard it will be noted that the end 208 of the runner 206 is disposed in engagement with the ground as shown in FIGURE 12. The pivotal connection of the runner 206 at its plates 203 with the stem 194 provides the end stand with a castering action during the forward movement of the vehicle in connection with the drag resistance of the ballast box 210. In this way, the end stand runner is at all times disposed in a direction parallel to the travel of the vehicle.

It will be noted that if the outer ends of the boom assembly engage an obstacle during the forward travel of the vehicle, the engagement of the cam rollers 144 within the concave cam surface 146 will permit the boom assembly to yieldingly pivot about its upright axis 140. Such pivotal movement, in either direction, has the effect of moving the cam plate 628 out of engagement with the roller 626, as shown in broken lines in FIGURE 7, so that the clutch spring 606 will effect a movement of the clutch lever 604 into a disengaged position. Thus, the engine of the tractor unit is disengaged in response to a yielding pivotal movement of the boom assembly as a result of its engagement with an obstacle or the like. It will also be noted that after the obstacle has been removed, the operator can swing the boom assembly back into its proper position laterally with respect to the vehicle wherein the rollers 144 are disposed within the cam surfaces 146. It will be noted that the cam plate 628 during this movement will again engage the rollers 626 to again effect movement of the clutch lever into an engaged position so that forward movement of the vehicle can continue.

*Outward Movement of the Carriage Assembly*

When the vehicle has moved forward into a position to pick up the next pipe section, as determined by the operator adjacent the end stand, the operator actuates the switch 450 into an "out" position which, as shown in FIGURE 24, energizes the coil 470 of the relay 444 across the main lines 426 and 428 through a circuit including lead 454, contacts 452 and 458 of switch 450 and leads 472 and 474. The energization of the coil 470 closes the switch contact 442 of the relay 444, which energizes the motor 406 across the main lines 426 and 428 through a circuit including leads 440, 446 and 448. When the motor 406 is energized cable 410 is moved, which has the initial effect of pivoting the bell crank 516 in a counter-clockwise direction as viewed in FIGURE 28, which moves the latch plate 530 into the dotted line position shown out of engagement with the cam plate end surface 536. In this way, the carriage assembly 14 is unlocked and then begins its outward travel toward the outer end of the operative boom section 157.

As the carriage assembly moves outwardly, the plates 650 move from beneath the adjacent ends of the rocker arms 630, as shown in FIGURE 38, permitting the latter to be pivoted by the action of springs 642 in a clockwise direction, as viewed in FIGURES 34 and 36, until stop 644 is engaged. This movement of the rocker arm assemblies 630 moves the cam plates 628 in engagement with the roller 626 upwardly permitting the spring 606 to return the clutch lever 604 to its disengaged position through the cable 658, bell crank 612, connecting link 620 and lever 622. Thus, the forward travel of the vehicle will be stopped as a result of the initiation of the outward movement of the carriage assembly 14.

It will be noted that the flywheel 85 provides a means of eliminating shock to the machine by the engaging and disengaging of the engine clutch. Worm drive gear box 86 has a non-reversible worm gear arrangement which works as a brake to hold the machine from coasting (drive wheel will not turn the worm gear). Therefore, upon disengagement of the clutch, the transmission is instantaneously stopped and the momentum of the forward motion of the machine is stopped suddenly in that the drive wheel cannot "coast" until this momentum is dispelled. The flywheel provides a gradual deceleration of the drive mechanism.

During the initial outward movement of the carriage assembly 14, cam plate 500 engages the cam follower 498 to again effect a pivot movement of the lever arm 492 to depress the plunger 476 of the switch 464. This depression of the plunger has the effect of resetting the switch 464 into its "on" position.

The outward movement of the carriage assembly continues under the operation of the motor 406 and cable 410 until it reaches a desired position adjacent the outer end of the boom. Again, it will be noted that during the outer movement of the carriage assembly 14 the same will reach a point wherein the weight of the counterbalancing boom section 166 is overbalanced and the operative boom section will move downwardly until the central portion of the runner 206 of the end stand assembly engages the ground and serves to support the outer end of the boom, as shown in FIGURE 10.

At the desired position of outward movement of the carriage assembly, the operator moves the switch 450 into an open position which, as shown in FIGURE 24, interrupts the energizing circuit to the coil 470 of the relay 444, which in turn causes the switch contact 442 to interrupt the energizing circuit to the motor 406.

The above procedure is repeated until each pipe section is moved from its previous position of use to its new position of use disposed laterally therefrom. It will be noted that the vehicle is capable of operation with the operative boom section 156 disposed on either side thereof. Thus, if it is desired to operate in the opposite direction when the next movement is to be carried out, the boom must be moved with respect to the vehicle around the pivotal axis provided by the sleeve 26, 180°. In such a position, the opposite rocker arm assembly 630 is brought into an operative position with respect to the roller 626.

Thus, after placing the last pipe section, the operator moves the carriage assembly 14 outwardly to break the clutch engagement and then sends the carriage assembly inwardly to position of proper balance of the boom or so that the end stand raises to moving position. The operator then engages the hand operated clutch on the tractor unit for forward self-propelled movement, guiding the unit by the tiller bar 114. By sharply turning the wheel 70, the engagement of the cam rollers 144 within the cam surfaces 146 permit yielding pivot of the boom assembly. As the tractor unit is propelled down the end of the field, the boom trails, guided by the end stand runner 208 having a castering action. After the tractor unit is headed back into the field, the manual clutch is disengaged. The operator can then manually lower the pipe gripping assembly 242 and let it raise to a clutch operating position, however, the clutch is not engaged as the boom remains pivoted out of engagement of the rollers 144 in surfaces 146. The operator then moves the outer end of the boom forward into operating position which engages the clutch. Finally the operator then, as described, stops the forward motion of the boom over the first pipe section to be moved and the above operation is repeated.

When it is desired to tow the vehicle from one field to another the guiding assembly is removed, by removing steering bar or pipe 100 from sleeve 94 and replacing with a conventional towing hitch similarly connected to sleeve 94 permitting connection to the draw bar of a tractor or the like. Preferably a driving lug on the front wheel is removed to permit the same to rotate freely. Finally, the stop pins 122 are removed to permit a greater steering movement of the front wheel.

It will thus be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:
1. Apparatus for moving irrigation pipe in a field from one position to a second position laterally remote therefrom comprising a wheeled vehicle, a boom mounted on said vehicle and having an operative portion extending laterally outwardly therefrom, a carriage mounted on said boom for movement longitudinally thereon between a first position adjacent said vehicle and a second position laterally outwardly therefrom, pipe gripping means, and linkage means stably mounting said pipe gripping means on said carriage in a position therebelow for movement in an upright plane between a lowered position wherein said pipe gripping means is operable to grip a pipe when said carriage is disposed in said second position and to release the gripped pipe when said carriage is disposed in said first position and a raised position wherein said pipe gripping means is movable with said carriage from said second position to said first position after a pipe has been gripped thereby and from said first position to said second position after the release of the pipe.

2. Apparatus as defined in claim 1 wherein said vehicle includes wheel means, motor means, and clutch means for drivingly connecting said motor means with said wheel means to propel said vehicle over the ground and for disconnecting said motor means from said wheel means for mounting said boom on said vehicle for movement about an upright axis and for yielding restraining movement of said boom about said upright axis out of a predetermined position and means operable in response to the yielding movement of said boom about said upright axis out of said predetermined position for controlling said clutch means to disconnect said motor means and said wheel means.

3. Apparatus as defined in claim 1 including means for moving said carriage between said position adjacent said vehicle and said position laterally outwardly therefrom, and means operable from a position adjacent the outer end of said boom for actuating said carriage moving means said carriage moving means including cable means, motor means operatively connected with said cable means for moving the latter, a latch element movably mounted on said carriage and operatively connected with said cable means, stop means on said boom for preventing movement of said carriage on said boom in a direction toward said vehicle when said carriage has reached said position adjacent said vehicle, means operable during the movement of said carriage toward said position adjacent said vehicle for deactuating said motor means just prior to said carriage reaching said position adjacent said vehicle, and abutment means on said boom for engagement by said latch element when said carriage reaches said position adjacent said vehicle, the arrangement being such that said latch element is moved by said cable means into engagement with said abutment means to lock said carriage into said position adjacent said vehicle as a result of the momentum of said motor means and said cable means after said stop means has stopped the movement of said carriage.

4. Apparatus as defined in claim 1 wherein said means for mounting said pipe gripping means on said carriage comprises a linkage mechanism stably supporting said pipe gripping means for movement between said raised and lowered position, said linkage mechanism including counterbalancing means of a strength sufficient to move said pipe gripping means into a raised position when no pipe is gripped thereby but insufficient to move said gripping means into said raised position when a pipe is gripped by said pipe gripping means, and means operable in response to the movement of said pipe gripping means into a raised position for locking said pipe gripping means in said last mentioned raised position when a pipe is gripped thereby.

5. Apparatus as defined in claim 1 wherein said boom includes a central section mounted on said vehicle for pivotal movement about a generally horizontal axis transverse with respect to the longitudinal extent of said boom, an elongated operative section extending from one end of said central section upon which said carriage is mounted, and a shorter counterbalancing section extending from the opposite end of said central section, and ground engaging means carried by the outer end of said operative boom section for supporting the outer end of said operative boom section from the ground when said carriage is disposed on the outer end portion of said operative boom section.

6. Apparatus as defined in claim 1 including motor means on said vehicle drivingly connectible with the wheels of said vehicle to propel said vehicle, said boom mounted on said vehicle for movement about a generally upright axis, means for yieldingly retaining said boom against movement about said axis in either one of two opposed positions, and means operable in response to the yielding movement of said boom out of either of said positions for disconnecting said motor means from driving relation with respect to said wheels.

7. Apparatus for moving irrigation pipe in a field from a previous position of use to a new position of use laterally remote therefrom comprising: a vehicle frame; wheel means supporting said frame for movement over the ground; motor means connected to said wheel means for propelling the vehicle frame over the ground; means for automatically steering said wheel means to guide said frame along a predetermined path during its movement; a boom having a central section mounted on said frame for pivotal movement about a generally upright axis and a generally horizontal axis, an elongated operative section extending outwardly from one end of said central section, and a shorter counterbalancing section extending outwardly from the other end of said central section; a carriage supported by said boom for movement on the operative section thereof between an inner position adjacent said vehicle and an outer position adjacent the outer end of said operative boom section; means for moving said carriage on said boom section between said positions; ground engaging means carried by the outer end of said operative boom section operable to support the latter in response to the pivotal movement of said boom about said horizontal axis resulting from the movement of said carriage outwardly beyond a predetermined intermediate position as determined by said counterbalancing boom section; pipe gripping means including a pair of jaws mounted for relative movement toward and away from each other between an opened position and a closed pipe gripping position and means for yieldingly maintaining said jaws in either of said positions; a linkage mechanism stably supporting said pipe gripping means on said carriage for movement between raised and lowered positions with respect thereto, said mechanism including counterbalancing means of a strength sufficient to move said pipe gripping means into a raised position when said jaws are opened but insufficient to move said pipe gripping means into said raised position when said jaws are in closed engagement with a pipe; means for locking said pipe gripping means in a raised position when said jaws are in closed engagement with a pipe; means operable from a position adjacent the outer end of said operative boom section for actuating said carriage moving means to effect movement of said carriage with said pipe engaging means locked in a raised position from said outer position to said inner position; means operable in response to the movement of said carriage into said inner position for deactuating said carriage moving means; means operable in response to the movement of said carriage into said inner position for releasing said locking means to thereby permit said pipe gripping means to move from its raised position to its lowered position; means operable in response to the last-mentioned movement of said pipe gripping means into its lowered position for moving said jaws from their closed pipe gripping position to their opened position to thereby release the pipe and permit said counterbalancing means to move said pipe gripping means into a raised position; means operable in response to the last-mentioned movement of said pipe gripping means into said raised position for actuating said motor means to propel said vehicle frame; and means operable from a position adjacent the outer end of said operative boom section for deactuating said motor means.

8. Apparatus as defined in claim 7 wherein said means for deactuating said motor means includes means operable from a position adjacent the outer end of said operative boom section for actuating said carriage moving means to effect movement from said inner position to said outer position and means operable in response to the movement of said carriage out of said inner position for deactuating said motor means.

9. Apparatus as defined in claim 7 including means operable in response to the movement of carriage into said inner position for locking the same therein against movement toward said outer position, said carriage-locking means being releasable in response to the actuation of said carriage moving means to effect movement of said carriage out of said inner position.

10. Apparatus as defined in claim 7 including means for yieldingly maintaining said boom in either one of two operative positions of pivotal movement about said horizontal axis disposed approximately 180° out of phase with respect to each other wherein said operative boom section extends laterally outwardly from opposite sides of said vehicle frame.

11. Apparatus as defined in claim 10 including means operable in response to the yielding movement of said boom out of either of said positions for deactuating said motor means.

12. In an article handling apparatus, the combination comprising a wheeled vehicle; a boom having a central portion mounted on said vehicle for pivotal movement about a generally horizontal axis disposed transversely with respect to said boom, an elongated operative portion extending from one end of said central portion and laterally outwardly with respect to said vehicle in cantilever fashion, and a shorter counterbalancing portion extending from the opposite end of said central portion; an article handling carriage mounted on said operative boom portion for movement longitudinally thereon between a position adjacent said vehicle and a position adjacent the outer end of said operative boom portion; and means extending downwardly from the outer end of said operative boom portion for engaging the ground to provide a substantially rigid support for the outer end of said boom to thereby relieve the cantilever support of said operative boom portion when said carriage is disposed adjacent the outer end thereof, said ground engaging means being disposed out of supporting relation with respect to said boom when said carriage is disposed adjacent said vehicle.

13. The combination as defined in claim 12 wherein said counterbalancing boom portion has ballast containing means mounted for longitudinal movement thereon and means for moving and maintaining said ballast containing means in different positions of longitudinal adjustment.

14. The combination as defined in claim 12 wherein said runner securing means includes a frame secured to said operative boom portion and a rigid structure mounted on said frame for pivotal movement about an upright axis.

15. The combination as defined in claim 14 wherein said runner securing means also includes means mounting the lower end of said rigid structure to the forward end of said runner for pivotal movement of the latter in a generally upright plane with respect to said structure and means for preventing upward pivotal movement of said runner with respect to said structure beyond a a predetermined position so that said runner will serve to support the outer end of said operative boom portion when disposed in said predetermined position.

16. The combination as defined in claim 15 wherein said runner includes a main supporting portion engageable with the ground when said runner is disposed in said predetermined position and an end portion disposed in trailing relation to said upright axis and extending upwardly at an angle from the rear end of said supporting portion for engaging the ground when said runner is pivoted downwardly with respect to said rigid structure.

17. A ground engaging device adapted to be secured to the outer end of a generally horizontally disposed boom pivotally mounted in cantilever fashion on a vehicle for supporting a load on the outer end of the boom when said vehicle is stationary and stabilizing the boom during movement of the vehicle, said device comprising a frame for securement with the boom, a ground engaging runner having an elongated supporting portion and an end portion extending upwardly at an angle from the rear end thereof, a rigid structure carried by said frame for rotation about an upright axis, said runner having its forward end pivoted to said structure for movement in a generally upright plane with said end portion thereof disposed in trailing relation to said axis, and means for preventing upward pivotal movement of said runner with respect to said structure beyond a predetermined position so that said runner will serve to support a load on said frame when disposed in said predetermined position.

18. A device as defined in claim 17 wherein said motion preventing means comprises a pair of telescoping members pivotally interconnected between said rigid structure and said runner.

19. A device as defined in claim 17 including means for limiting the downward pivotal movement of said runner with respect to said rigid structure.

20. In an apparatus of the type described, the combination comprising a vehicle having wheel means supporting the same for movement along the ground, motor means on said vehicle drivingly connectible with said wheel means to propel said vehicle, a boom mounted on said vehicle for movement about a generally upright axis, means for yieldingly retaining said boom against movement about said axis in at least one position, and means operable in response to the yielding movement of said boom out of said one position for rendering said motor means ineffective to propel said vehicle, said boom yieldingly retaining means comprising a pair of roller members and a pair of cam members having concave surfaces for receiving said roller members, one of said pair of members being mounted on said boom, the other pair of said members being mounted on said vehicle, the arrangement being such that said boom is supported by said vehicle through said cam and roller members when said roller members are in engagement with said concave surfaces.

21. In an apparatus of the type described, the combination comprising a vehicle having wheel means supporting the same for movement along the ground, motor means on said vehicle drivingly connectible with said wheel means to propel said vehicle, a boom mounted on said vehicle for movement about a generally upright axis, means for yieldingly retaining said boom against movement about said axis in at least one position, clutch means between said motor means and said wheel means actuatable to drivingly connect and disconnect said motor means with said wheel means, means carried by said vehicle in a position spaced laterally from said upright axis for actuating said clutch means, and means carried by boom for engaging said clutch actuating means when said boom is disposed in said one position, said last mentioned means being movable out of operative engagement with said clutch actuating means in response to the movement of said boom out of said one position.

22. In an apparatus of the type described, the combination comprising a vehicle having wheel means supporting the same for movement along the ground, motor means on said vehicle drivingly connectible with said wheel means to propel said vehicle, a boom mounted on said vehicle for movement about a generally upright axis, means for yieldingly retaining said boom against movement about said axis in either one of two opposed positions, clutch means between said motor means and said wheel means actuatable to drivingly connect and disconnect said motor means with said wheel means, single means carried by said vehicle in a position spaced laterally from said upright axis for actuating said clutch means, and a pair of means carried by said boom in spaced laterally opposed positions with respect to said axis for alternately engaging said single clutch actuating means when said boom is disposed in said two opposed positions, each one of said pair of means being engageable with said clutch actuating means to actuate the latter to drivingly connect said motor means and said wheel means when said boom is disposed in one of said two positions and movable out of engagement therewith in response to the movement of said boom out of said position.

23. In an apparatus of the type described, the combination comprising a boom adapted to be carried in a generally horizontal position on a vehicle, a carriage supported by said boom for longitudinal movement with respect thereto, article engaging means, and linkage means stably mounting said article engaging means to said carriage for stable movement of said article engaging means along a predetermined path between a raised position adjacent to and beneath said carriage and a lowered position beneath said carriage spaced vertically below said raised position.

24. An apparatus as defined in claim 23 including means operable in response to the movement of said article engaging means into said raised position for releasably locking said article engaging means in said raised position whereby articles engaged thereby can be moved into said raised position and retained therein, said article engaging means being movable into a lowered position under the influence of the weight of the articles engaged thereby in response to the release of said locking means, means operable in response to the last-mentioned movement of said article engaging means into its lowered position for moving said article means into said second position whereby articles engaged thereby are released in said lowered position, and counterbalancing means operable to bias the released article engaging means into a raised position.

25. The combination as defined in claim 24 including dashpot means operable to control the rate of movement of said article engaging means into said lowered position after the release of said locking means.

26. Apparatus as defined in claim 23 including track means, said carriage being supported by said track means on said boom for movement thereon, stop means disposed in a fixed position with respect to said track means for preventing movement of said carriage thereon in one direction beyond a predetermined position, a movable latch element carried by said carriage, abutment means disposed in a fixed position with respect to said track means for engagement by said latch element when said carriage is in said predetermined position, and means for effecting movement of said carriage on said track means at least in the opposite direction away from said predetermined position, said last-mentioned means including means operatively connected with said latch element for effecting movement of the latter out of engagement with said abutment means in response to the actuation of said carriage moving means.

27. In an apparatus of the type described, the combination comprising a support, article handling means, a linkage mechanism mounting said article handling means on said support for movement between raised and lowered positions, said article handling means including a pair of jaws movable relatively toward and away from each other between an opened position and a closed article gripping position, a toggle linkage interconnected between said jaws movable into opposed over center positions in conjunction with the movement of said jaws into said opened and closed positions respectively, spring means resiliently maintaining said jaws in either of said positions, a latch member operatively connected with said toggle linkage and movable from a first position into a second position for effecting an overcenter movement of said toggle linkage wherein said jaws are moved from their closed position to their opened position in conjunction therewith, and an actuating element operatively connected with said linkage mechanism for engaging said latch member and moving the same from said first position to said second position in response to the movement of said article handling means from its raised position to its lowered position through a predetermined portion thereof.

28. The combination as defined in claim 27 including means operable in response to the movement of said article handling means into a raised position for locking said article handling means in said last-mentioned raised position.

29. The combination as defined in claim 28 wherein said linkage mechanism includes counterbalancing means of a strength sufficient to move said article handling means into a raised position when said jaws are in their opened position but insufficient to so move said article handling means when said jaws are in closed engagement with an article.

30. The combination as defined in claim 29 wherein said linkage mechanism includes an arm pivoted to said support, an elongated generally vertically disposed member pivoted at its upper end to the outer end of said arm and carrying said jaws at its lower end, and a stabilizing linkage interconnected between said support and said elongated member for stably guiding said member along a predetermined path during the pivotal movement of said arm.

31. The combination as defined in claim 30 including means movably mounting said latch member on said elongated member adjacent the connection thereof with said arm.

32. The combination as defined in claim 31 wherein said last-mentioned means comprises a link pivotally interconnected between the lower end of said latch member and said elongated member, a stop member fixed to said elongated member above said link, an elongated stop engaging surface on said latch member, and spring means between said latch member and said elongated member resiliently urging said stop surface into engagement with said stop member.

33. The combination as defined in claim 32 wherein said actuating element comprises a bell crank pivotally supported by said elongated member adjacent its connection with said arm, said bell crank having a latch engaging arm, said latch member including an abutment for engagement with said latch engaging arm, spring means biasing said bell crank into a limiting position wherein said latch engaging arm is disposed above said abutment when said latch member is disposed in said first position.

34. The combination as defined in claim 33 wherein the arm of said linkage mechanism includes a first portion for engaging said bell crank during the movement of said article engaging means from its lowered position to its raised position to pivot said bell crank against the action of the spring means biasing the same and hence move said latch engaging arm beneath said latch member abutment and a second portion for engaging said bell crank during said predetermined portion of the movement of said article engaging means to pivot said bell crank in the direction of spring bias to thereby effect the movement of said latch member from said first position to said second position as a result of the engagement of said latch engaging arm with said latch member abutment.

35. In an apparatus of the type described, the combination comprising: a frame, a pair of transversely spaced arms pivoted to said frame for movement about a common transversely extending axis, a pair of elongated transversely spaced generally vertically disposed members pivotally connected at their upper ends to the outer ends of said arms; article handling means carried by the lower ends of said members and extending therebetween; a pair of stabilizing linkages interconnected between said frame and said members intermediate the ends of the latter; said arms, members and linkages being disposed outwardly beyond opposite sides of said frame so that said article handling means is supported for movement between a lowered position wherein said members are disposed entirely below said frame and said arms and linkages extend downwardly from said frame thereto and a raised position below and adjacent said frame wherein said arms, linkages and members extend upwardly above said frame the pivotal connection of said members with said arms and said linkages permitting such movement.

36. The combination as defined in claim 35 including an elongated generally horizontally disposed boom, and means mounting said frame beneath said boom for longitudinal movement thereon, said boom having a width less than the transverse spacing between said arms, members and linkages.

37. The combination as defined in claim 35 wherein said article handling means comprises a first mounting arm rigidly secured to the lower end of each elongated member, a first jaw carried by each of said first arms, a second mounting arm pivotally carried by the lower end of each elongated member, a connecting bar extending between said second arms rigidly interconnecting the same for movement together, a second jaw carried by each of said second arms, an overcenter toggle linkage between a pair of first and second mounting arms, and spring means for resiliently maintaining said toggle linkage on opposed overcenter positions.

38. In an article handling apparatus the combination comprising track means, an article handling carriage assembly supported by said track means for movement between first and second positions thereon, means for moving said carriage assembly on said track means between said positions, said moving means including cable means and motor means operatively connected with said cable means for moving the latter, latch means movably mounted on said carriage assembly and operatively connected to said cable means for transmitting the movement of said cable means to said carriage assembly, stop means mounted in a fixed position with respect to said track means for preventing movement of said carriage assembly in a direction away from said first position when said carriage assembly has reached said second position, means operable during the movement of said carriage assembly toward said second position for deactuating said motor means just prior to said carriage assembly reaching said second position, and abutment means mounted in a fixed position with respect to said track means for engagement by said latch means when said carriage assembly reaches said second position, the arrangement being such that, during the movement of said carriage assembly into said second position, said latch means is first moved into an abutment means receiving position as a result of the momentum of said carriage assembly after the deactuation of said motor means and is finally moved into an abutment means engaging position to lock said carriage assembly into said second position as a result of momentum of said motor means and said cable means after said stop means has stopped the movement of said carriage assembly, said latch means being releasable from said abutment means in response to the movement of said cable means to move said carriage assembly out of said second position toward said first position.

39. In an apparatus of the type described, the combination comprising a boom adapted to be carried in a generally horizontal position on a vehicle, a carriage supported on said boom for longitudinal movement with respect thereto, article engaging means engageable with articles to be held and releasable therefrom, linkage means mounting said article engaging means on said carriage for movement between raised and lowered positions, means operable in response to the movement of said article engaging means into a raised position for releasably locking said articles engaging means in said raised position, means operable in response to the movement of said carriage into a predetermined position with respect to said boom when said article engaging means is locked in said raised position for releasing said locking means, said article engaging means being movable into a lowered position under the influence of the weight of the articles engaged thereby in response to the release of said locking means, means operable in response to the last-mentioned movement of said article engaging means into said lowered position for releasing said article engaging means so that articles engaged thereby are released in said lowered position, and counterbalancing means operable to bias said article engaging means into a raised position in response to the release of the articles engaged thereby in said lowered position.

References Cited in the file of this patent

UNITED STATES PATENTS

| | | |
|---|---|---|
| 86,703 | Shoemaker et al. | Feb. 9, 1869 |
| 777,450 | Taylor | Dec. 13, 1904 |
| 963,490 | Wheelock | July 5, 1910 |
| 983,772 | Sain | Feb. 7, 1911 |
| 1,287,336 | Kendall | Dec. 10, 1918 |
| 1,522,408 | Bayard | Jan. 6, 1925 |
| 1,591,635 | Mandt | July 6, 1926 |
| 1,855,838 | Kranick | Apr. 26, 1932 |
| 1,933,225 | Smith | Oct. 31, 1933 |
| 2,447,073 | Kreutzer | Aug. 17, 1948 |
| 2,512,643 | Hannon | June 27, 1950 |
| 2,559,703 | Bergman | July 10, 1951 |
| 2,659,624 | Harz | Nov. 17, 1953 |
| 2,702,678 | Flock | Feb. 22, 1955 |
| 2,703,656 | Banks | Mar. 8, 1955 |
| 2,798,622 | Kelley | July 9, 1957 |
| 2,803,489 | Zito | Aug. 20, 1957 |
| 2,811,089 | Blackstone | Oct. 29, 1957 |
| 2,818,182 | Goesch | Dec. 31, 1957 |
| 2,996,197 | Smeal | Aug. 15, 1961 |

FOREIGN PATENTS

| | | |
|---|---|---|
| 517,428 | Italy | Feb. 28, 1955 |